United States Patent [19]

Konheim et al.

[11] 4,223,403
[45] Sep. 16, 1980

[54] CRYPTOGRAPHIC ARCHITECTURE FOR USE WITH A HIGH SECURITY PERSONAL IDENTIFICATION SYSTEM

[75] Inventors: Alan G. Konheim, Yorktown Heights, N.Y.; Louis B. Tuckerman, III, Briarcliff Manor, N.Y.

[73] Assignee: International Business Machines Corporation, Armonk, N.Y.

[21] Appl. No.: 920,915

[22] Filed: Jun. 30, 1978

[51] Int. Cl.³ .............................................. H04L 9/00
[52] U.S. Cl. ................................. 375/2; 340/149 A; 340/152 R
[58] Field of Search ........... 340/149 R, 149 A, 152 R; 178/22

[56] References Cited

U.S. PATENT DOCUMENTS

| | | | |
|---|---|---|---|
| 3,665,162 | 5/1972 | Yamamoto et al. | 340/149 A |
| 3,673,571 | 6/1972 | Constable | 340/149 A |
| 3,938,091 | 2/1976 | Atalla et al. | 340/149 A |
| 3,956,615 | 5/1976 | Anderson et al. | 340/149 A |
| 3,985,998 | 10/1976 | Crafton | 340/149 A |
| 4,025,760 | 5/1977 | Trenkamp | 340/149 A |
| 4,123,747 | 10/1978 | Lancto et al. | 340/149 A |

*Primary Examiner*—Howard A. Birmiel
*Attorney, Agent, or Firm*—Roy R. Schlemmer, Jr.

[57] ABSTRACT

A Cryptographic Architecture for improving the security of Cash-Issuing or similar Terminal Systems when it is necessary to operate Off-Host. Each Terminal is connected to a central Controller which is in turn connected to a central Host. The Master cryptographic key for use in the personal identification mechanism provided in the system is stored in the Controller rather than the terminal. Means are provided whereby said Controller performs customer identification operations when the Host is not available to do so. Only data input at the Terminal is utilized in transmission between the Terminal and the Controller whereby the master system key is never exposed at either the Terminal or the communication link. Additionally, a Terminal status message is utilized with each transaction to prevent a "stale" message from being used to bypass the security procedures by means of eavesdropping or the like.

16 Claims, 17 Drawing Figures

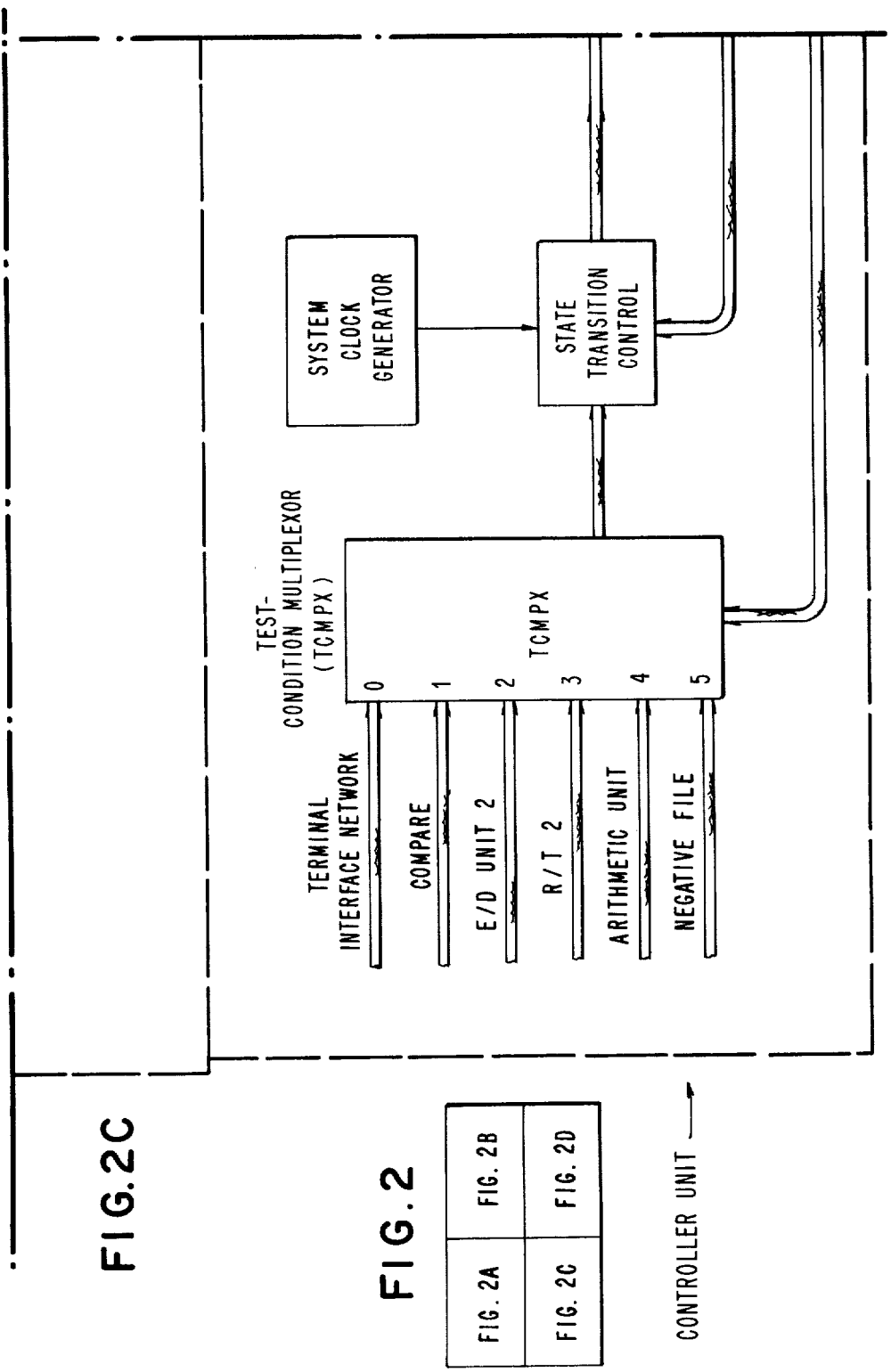

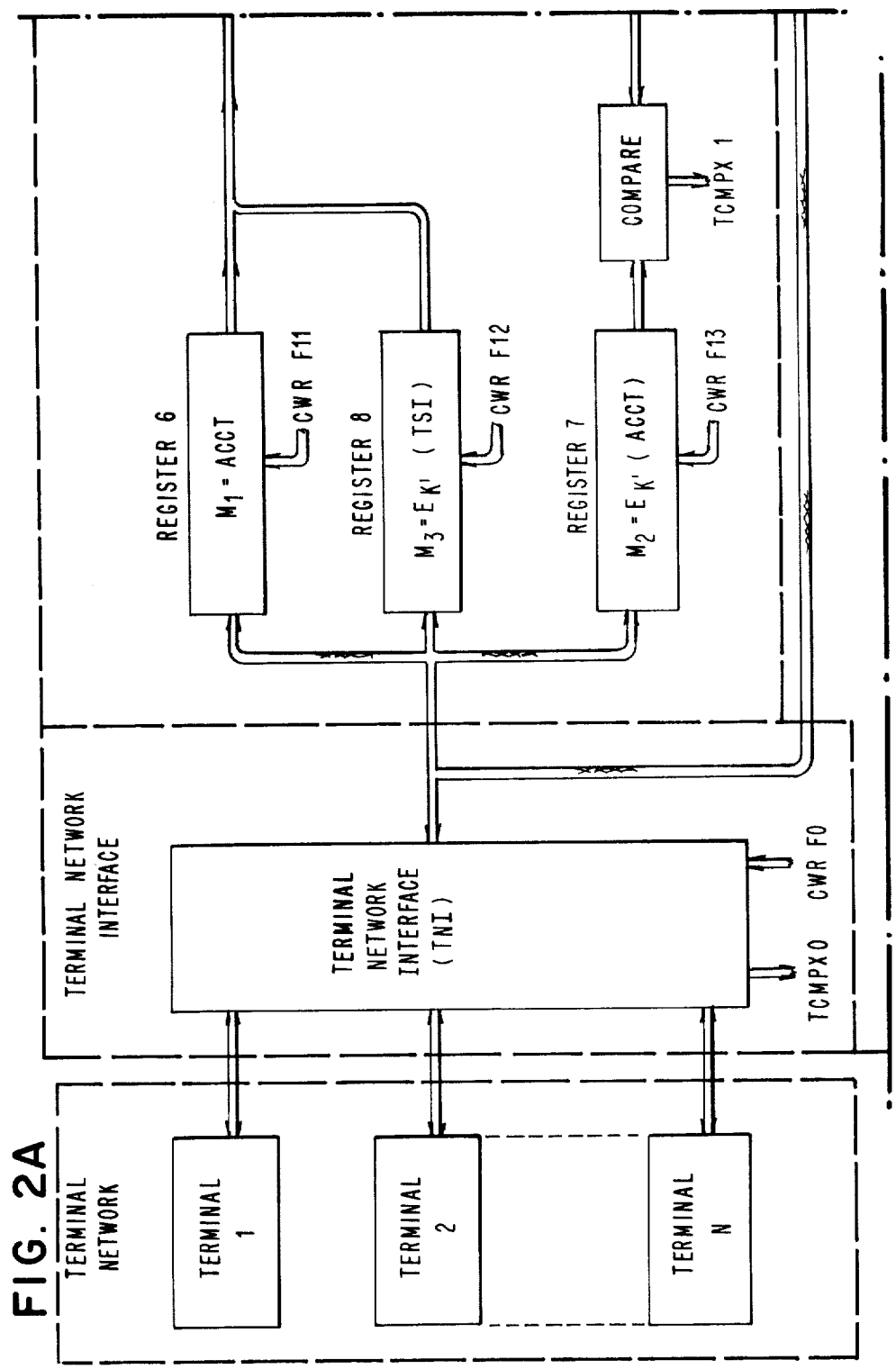

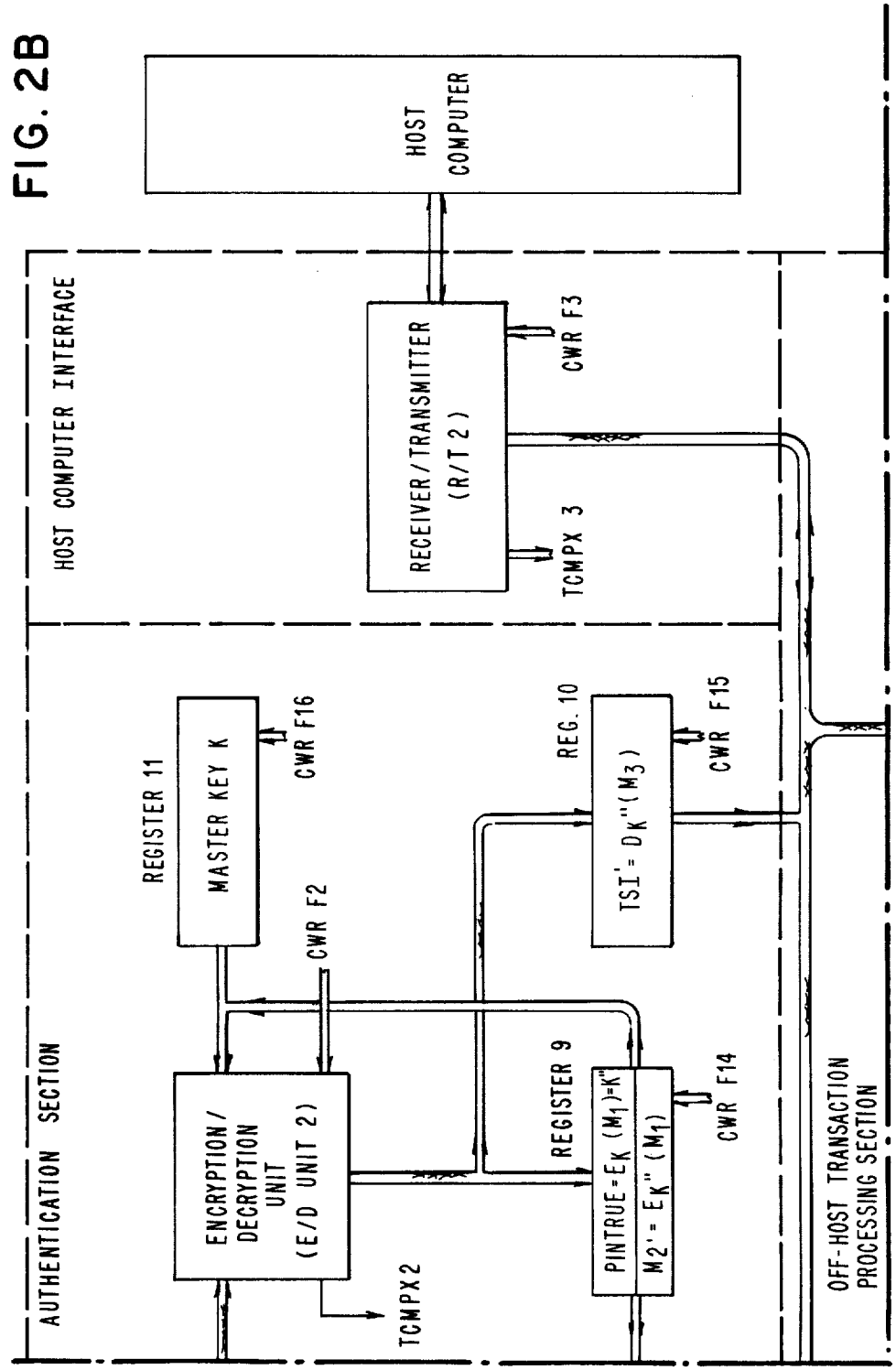

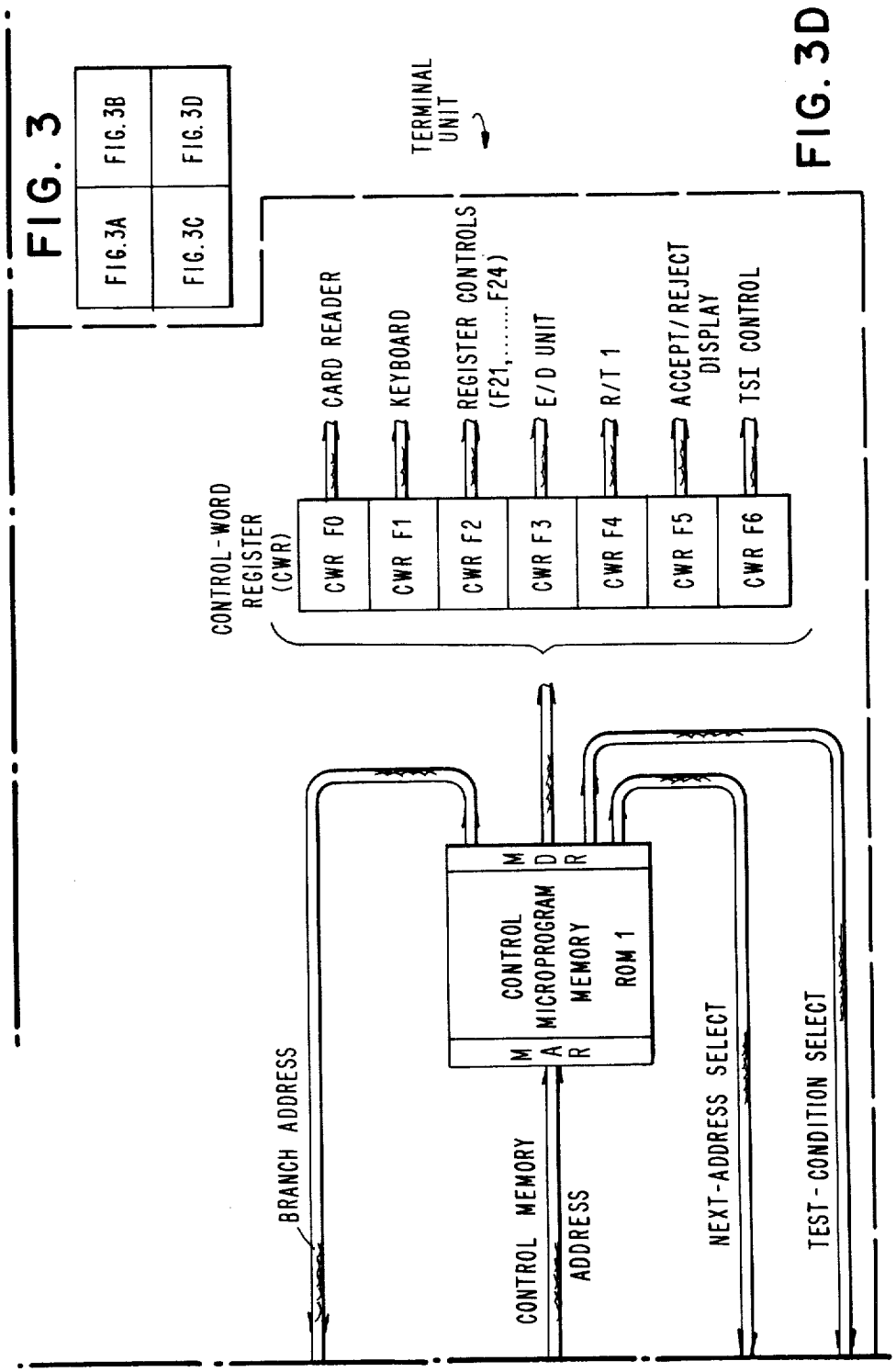

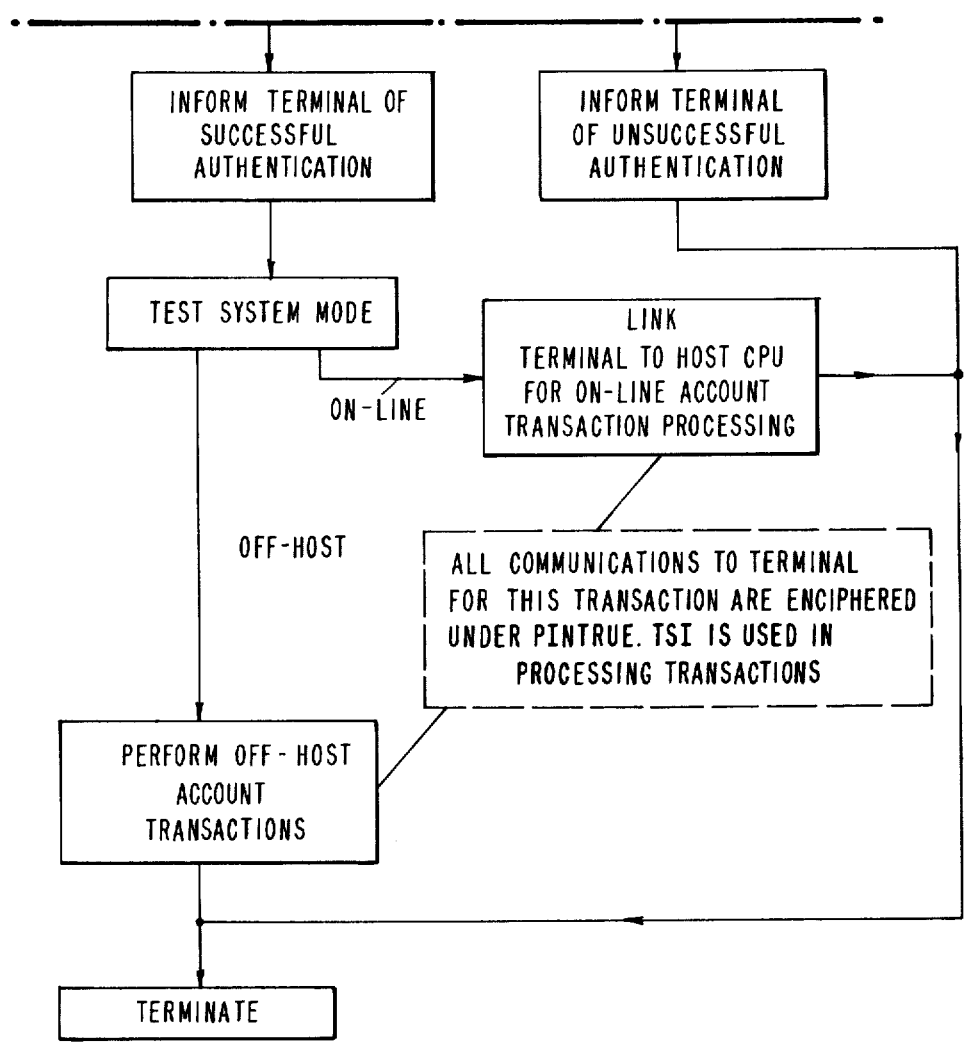

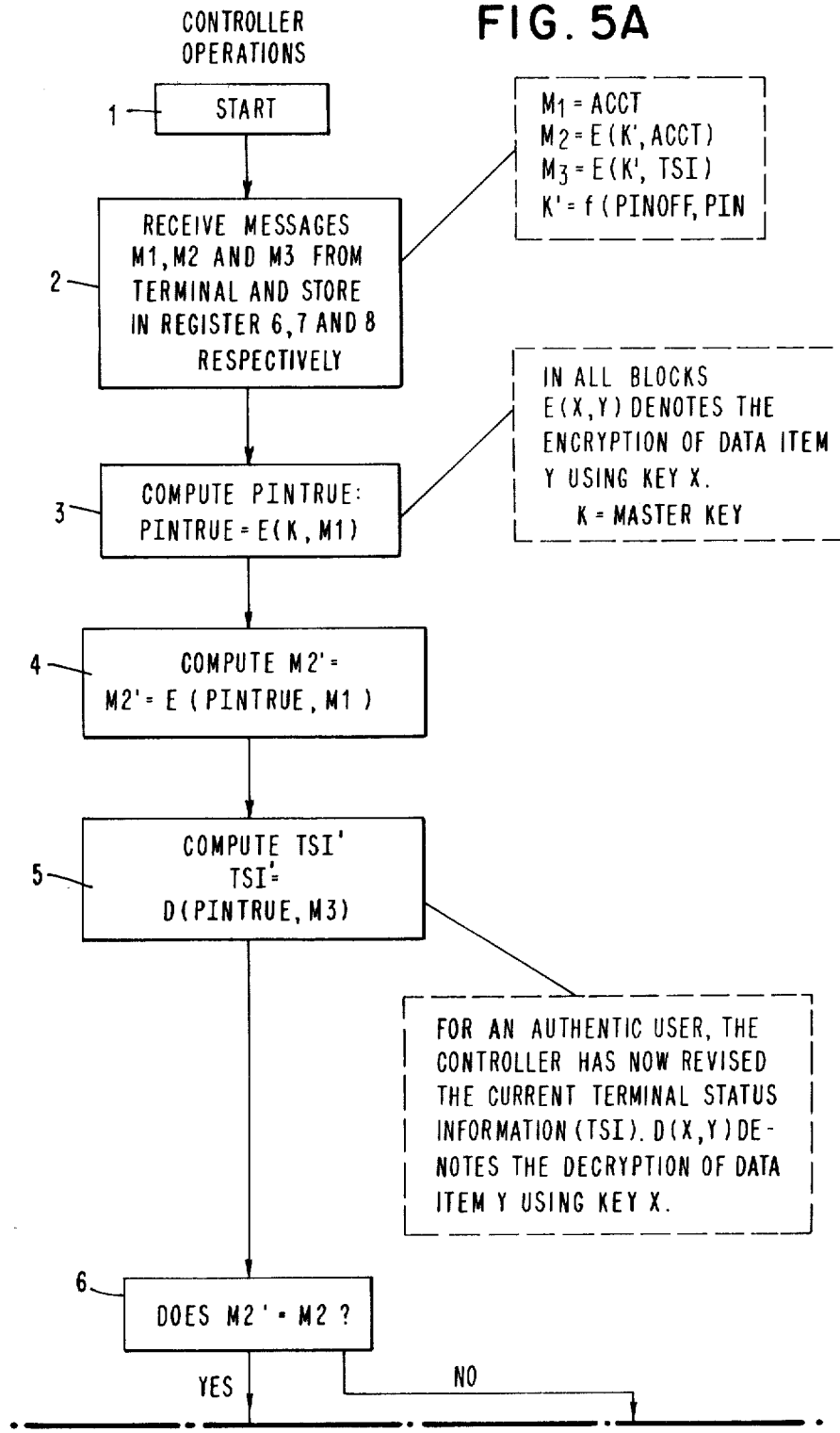

CRYPTOGRAPHIC ARCHITECTURE FOR USE WITH A HIGH SECURITY PERSONAL IDENTIFICATION SYSTEM

DESCRIPTION

Technical Field

The present invention relates generally to the field of personal identification utilizing a computer or similar computational hardware. More particularly, it is related to personal identification when used with a personal identification token such as a charge account card or the like at some sort of a terminal device capable of reading information stored thereon. A typical example of such a terminal would be a cash-issuing terminal as conventionally used by many large banking institutions to simplify various types of transactions including but not limited to the issuing of cash to a person requesting same. It is to be understood that the present system could equally well be used with a Terminal system similarly equipped with a card reading device and for performing some function in accordance with a "valid" determination such for example as allowing a person to enter an otherwise locked gate or the like.

It is further assumed that the terminal is provided with facilities for encrypting messages to be sent to a Host computer or intermediate Controller for its use in validating or invalidating the transaction, and facilities for decrypting response messages containing such validation information.

The information on which this validation is based conventionally includes information on a card or token presented by the user to the terminal, and a segment of user entered data, normally referred to as a PIN (personal identification number). This PIN is then utilized in a predetermined fashion within the hardware provided at the Host Computer to which said terminal is connected. The host computer on receipt of these messages then extracts data relative to the identified account and, by means of further operations, validates or invalidates the person attempting to use the terminal.

While such identification procedures may be made extremely secure when the host is available to the terminal for authentication, problems arise during periods when the host is not available, such for example as on weekends, when it might be desirable to have the terminals available to customers when the central facility is not operating or during periods of equipment outages at the host. One method utilized in the past for handling this situation has been to have the basic encryption key utilized during the encipherment and decipherments procedures necessary for authentication to be entered by system personnel at each terminal. For such systems the secrecy of the key is compromised as a function of the number of terminals in which it is entered. As more terminals are used and thus, more people who must physically enter the key at the terminals are increased, the greater the probability that a dishonest person might be involved. Similarly, although great precautions are taken to render the key storage areas of the highest reliability, there is also an increased possibility that someone might be able to intercept the key information as it is entered into the terminal or in some other way obtain the true encryption key.

It is accordingly a primary object of the present invention to provide a system for authenticating terminal users wherein it is not necessary to ever enter the basic system encryption key into the terminal for successful off-host operation.

It is a further object of the invention to provide such a personal identification system wherein the keys are entered only into centralized Controllers, each of which is connected to a plurality of terminals and to the host computer.

It is yet another object of the present invention to provide such a system wherein each of the Controllers performs the user identification operation whenever the host is unavailable.

It is a still further object of the present invention to provide such a personal identification system wherein status information from the terminal is included with the authentication query to the Controller and included subsequently in messages back to the terminals which prevents "stale" authentication messages obtained by eavesdroppers to be used in an attempt to overcome the system security provisions.

It has been found that a more secure personal identification system may be realized by a system architecture which includes the following provisions. A plurality of messages are transmitted from the Terminal to the Controller using personally entered criteria and criteria appearing on a token presented by a customer. The Controller which is provided with the highly secure system encryption key establishes the authenticity of the customer. Subsequently a message is transmitted from the Controller back to the terminal again using only data supplied by the terminal to inform the Terminal of a proper (or improper) identification.

It is to be understood that the Controller initiated authentication procedure would be utilized at least during offhost operations.

BRIEF DESCRIPTION OF DRAWINGS

FIG. 2 comprises an organizational diagram of FIGS. 2A through 2D.

FIGS. 2A through 2D comprise a detailed functional block diagram defining the architecture of a Controller block as shown in the block diagram of FIG. 1.

FIG. 3 comprises an organizational diagram for FIGS. 3A through 3D.

FIGS. 3A through 3D comprise a detailed functional block diagram defining the architecture of a Terminal block as shown in the block diagram of FIG. 1.

FIG. 5 comprises an organizational diagram of the FIGS. 5A and 5B.

FIGS. 5A and 5B comprise an operational sequence diagram of the hardware of the controller architecture shown in FIGS. 2A through 2D during an off-host authentication procedure occurring within the Controller.

DISCLOSURE OF INVENTION

Figure 1:
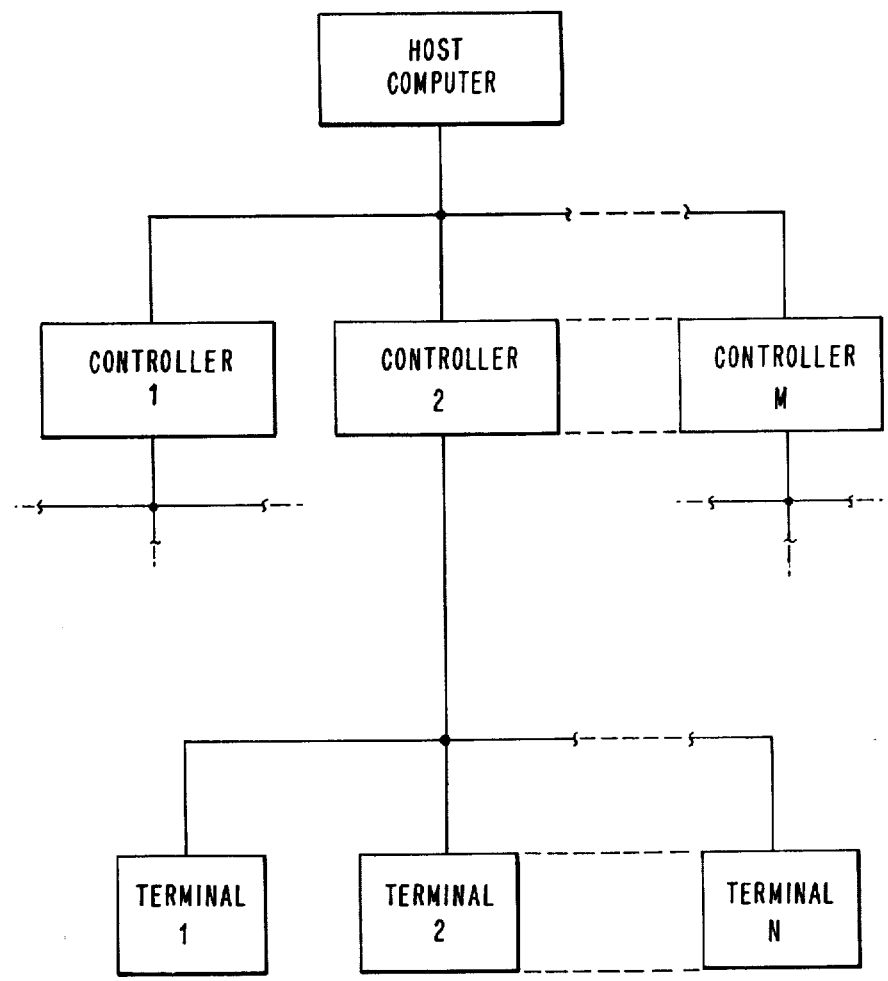
FIG. 1 comprises an overall high level block diagram of a terminal driven computer system incorporating the cryptographic system architecture of the present invention.

In a system of cash-issuing Terminals connected to one or more computers for authorization purposes, it is essential, and standard practice, to have a secret personal identification number (PIN) associated with each account number (ACCT), to impede the misuse of lost, stolen, or forged identification ("credit") cards. It is also desirable, and is the practice in existing systems that communication between the terminal and the rest of the system (central Host computer or separate Controller) be enciphered, in order that an opponent not be able to learn PINs by passive wiretapping, or authorize transactions by active wiretapping. It is further desirable that the validity of each PIN be systemwide, independent of which Terminal and Controller are involved in a transaction.

This invention augments this design philosophy with the following desirable additional objectives:

(a) to arrange that the PIN for each ACCT be arbitrarily choosable and alterable, without changing the ACCT;

(b) to arrange that authentication be achievable by any of a set of Controllers of limited storage capacity (too small to contain a table of PINs vs. ACCTs) to which the various Terminals are attached, at times when the Host is unavailable; and (c) to arrange that no cryptographic keys are stored in the Terminal for otherwise an opponent might learn such a key via the possible untrustworthiness of one of the persons involved in entering the keys into many Terminals, or else by forcibly invading a terminal, and the using such a key to compromise the system.

The means provided by the present invention for accomplishing these objectives are the following. We arrange that the cryptographic key to be used in enciphering a transaction between a Terminal and a Controller or Host shall be large enough (e.g. 56 bits) to deter its determination by an opponent by a trial of all possible keys, and also shall vary drastically from one transaction (involving a particular ACCT) to another (involving a different ACCT), so that an opponent who is also a legitimate user of the system cannot, from information in his possession, thereby learn the keys for other ACCTs. To do this we arrange that the key for each transaction, which we will call PINTRUE, shall depend on the ACCT in a way which is readily determinable both (a) at any Controller and/or Host, and (b) at any Terminal. To achieve (a) we define the PINTRUE for each ACCT to be a cryptographic function of ACCT, under a systemwide master key K which is known to all Controllers and the Host, but which for security reasons is not stored in the Terminals. For each transaction, the Controller (or Host) computer recomputes PINTRUE as the given function of this master key K and of ACCT which has been transmitted to the Controller by the Terminal which has read it from the Customer's card. To accomplish (b) we arrange that the PINTRUE for the account be derivable from information furnished by the customer in the form of the card and his PIN. PIN is small enough for the customer to remember (say 4 to 6 decimal digits or letters), but PINTRUE is large enough (say 56 bits) to render it impractical for an opponent to enumerate all possible PINTUREs on a computer. We put on the card, in machine-readable form, a "PIN offset" PINOFF which when suitably combined with PIN will yield PINTRUE, which is thereby available at the Terminal to serve as a communication-encrypting key. This law of combination, and the resulting definition of PINOFF, must be such that, given an arbitrarily chosen PIN and the system-defined PINTRUE, such a PINOFF can be determined at the time the card is manufactured. A suitable such law of combination is to exclusive-or the chosen PIN with an equal-length subset of PINTRUE to obtain PINOFF (at the time of manufacture of the card) and with the corresponding subset of PINOFF to obtain PINTRUE (at the time of use of the card).

In addition, the reuse of stale keys by an opponent is thwarted by an exchange of encrypted messages whose variable plaintext is known to both the Terminal and the Controller, for example, terminal-status information (TSI) such as the amount of money remaining in the Terminal, or the serial-number of the transaction.

The objects of the present invention are accomplished in general by a personal identification architecture wherein one or more remotely located terminals, each of which is capable of receiving data supplied by an individual, via the reading of a credit card-like device and keyboard entry. Each Terminal is in turn connected via a data communication link to a Controller. Each Controller is connected to a central Host computer via a suitable data communication link. Said Controller performed personal identification procedure is available at least when the Host is not available to the system for performing personal identification functions. The identification system includes means at the Terminal for transmitting as message $M_1$ a first portion of data, called ACCT, supplied by said individual (typically via a machine-readable card) to the Controller in clear form. Means are additionally provided for computing an encryption key from data supplied by said individual which key is in turn utilized by an encryption/decryption block included in the said terminal for encrypting said first block of data and transmitting same to said Controller as a second message ($M_2$). The Controller includes an encryption/decryption unit identical to that contained in the terminal device and further has stored therein a master key (K) for controlling the operation of the Controller encryption/decryption unit. Whenever a personal identification request is received by the Controller, the Controller accesses the first message $M_1$ comprising the data block 1 entered by the individual into the Terminal and encrypts same in the encryption/decryption unit under control of the master key. The results of this encryption are used as a key to a encipher $M_1$ into a message $M_2'$ which is then compared with message $M_2$ received from the terminal and if a comparison is successful an "accept" signal is sent from the Controller back to the Terminal which indicates that account transaction may proceed. In the case of a cash-issuing banking terminal this would cause a specified amount of cash to be directly issued to the individual or alternatively it might permit some form of credit to be extended to the individual. In the case of a facility access system the Terminal "accept" signal might allow the individual to utilize a computer terminal or gain access to a facility such as a building, plant or some other physical facility.

Having thus very generally related the operations of the present invention there will follow a general discussion of the theory of operation of the present invention with respect to the high level block diagram of FIG. 1. In referring to the figure it will be noted that a series of Controllers (1,2, ... N) are connected over suitable lines to a host computer. In turn each Controller has a series of Terminals (1,2, ... N) connected thereto. Thus, any of the individual terminals are selectively connectable to the host computer through their respective Controller.

In the subsequent description of the invention it will be assumed that the environment of the present invention is in a cash-issuing terminal system wherein each terminal is capable of issuing cash to a customer upon a suitable request and a subsequent system approval of the customer's identification.

It is further assumed that each customer is in possession of a portable token such as a credit card containing an account number (ACCT) and a personal identification offset number (PINOFF) both of which are stored in machine readable form on said credit card and wherein each terminal is capable of appropriately reading said data from the credit card. It is further assumed that each customer has in his possession a personal identification number (PIN) which is committed to memory and which he is capable of entering into the Terminal at a suitable data entry point, such as a keyboard, upon request.

It is assumed that the system is capable of operation in one of two modes. The first is On-Line wherein each transaction requested by a customer at a terminal is sent directly to the Host for validation. The Host may maintain a positive file listing all ACCTs, the customers' names, possibly but not necessarily the PINTRUES's to be described, and a considerable unspecified further amount of information relative to the account. In the On-Line mode the Host controls the validation operations and will send an "accept" or "reject" message in appropriate form to the terminal upon application by the customer. This validation will include the steps to be described for a Controller (excluding the computation of PINTRUE if not needed). The particular manner in which additional checks are done by a particular system is of no particular interest to the present invention and will not be discussed further here.

The second mode of operation is Off-Host which implies that the Host Computer is not available for service to perform account validation operations such for example as on weekends or during equipment outages, but the Controller to which the Terminal is attached is available.

It is the need of this operational alternative to which the present invention applies and which will now be described in detail. The Controllers will not have as much storage capacity as the Host, in particular they cannot store PIN's for all accounts. It is noted in passing that the Controller may include a negative file, listing accounts which are no longer valid, which list may be checked by the Controller before a final validation indication is returned to a terminal. Other validation operations could also be built into the Controller. Examples might be total transaction size, number of transactions within a specified time period, etc. However, these do not relate materially to the inventive concepts being described herein and are not described further.

At this point there will follow a general description of the computations made within the Terminal and the Controller without specifically referring to the disclosed hardware of FIGS. 2A through 2D and 3A through 3D. There will follow a specific description of the operation of the system hardware disclosed in these two figures with reference to the series of operational sequence charts of FIGS. 4A, 4B, 5A and 5B.

Returning now to the description of the overall operation of the system to perform a validation or authentication operation it is assumed that the three above items of data, namely ACCT and PINOFF contained in the customer's credit card and PIN committed to his memory are functionally related by the formula $$\text{PINOFF} \boxplus \text{PIN} = \text{PINTRUE} \tag{1}$$

$$\text{PINTRUE} = E_K(\text{ACCT}) \tag{2}$$

In this formula the value $E_K$ denotes encipherment with the master key K of the quantity in the parentheses, in this case the account number (ACCT). This could also be written as E(K,ACCT).

It is assumed that PINOFF and PIN are combined for example by bitwise addition modulo 2 into the value PINTRUE.

In such cryptographic systems it is desired, however, that the size of PINTRUE be sufficiently large to resist discovery and accordingly the size of 56 bits has been found suitable. in the presently disclosed embodiment, for example, if PINOFF is expressed as a 56 bit binary number, i.e. $(x_1, x_2, \ldots, x_{56})$ and PIN is chosen by six alphabet characters written or decoded as a thirty bit binary number $(y_1, y_2, \ldots, y_{30})$ then the combination of these two by means of bitwise addition modulo 2 would be expressed by the formula $$(\text{PINOFF} + \text{PIN}) = (x_1 \boxplus y_1, \ldots, x_{30} \boxplus y_{30}, x_{31}, x_{32}, \ldots, x_{56}) \tag{3}$$

The above sizes of all PINTRUE, PINOFF and PIN are not critical but represent typical sizes which would provide a high degree of security via the large size PINTRUE while at the same time maintaining a relatively small number for PIN which must be committed to memory by the customer accurately.

Having generally set forth the functional relationship of the account number (ACCT), the personal identification number offset (PINOFF) and the personal identification number itself (PIN), the present architecture utilized to make the requisite computations and comparisons in a highly secure manner will now be set forth. It should be first noted that the encryption/decryption units located in both the terminal device and the Controller must be identical block cipher key controlled encryption devices. The specific algorithm performed by the devices is not critical to the present invention, however, all of the devices in a single system must obviously operate identically. A suitable encryption/decryption device would be that specified by the National Bureau of Standards Federal Information Processing Standard for Data Encryption Systems number 46. The operation of the system proceeds as follows. First the customer places his credit card in the terminal and the account number (ACCT) and the personal identification number offset (PINOFF) are read by the Terminal. Next the customer keys in his individual PIN. The Terminal controls cause the following messages to be sent to the Controller. The first one ($M_1$) comprises the account number (ACCT) in clear form. (See later for possible encryption of ACCT).

$$M_1 = \text{ACCT in the clear} \tag{4}$$

The second message ($M_2$) is computed by the Terminal and is represented by the following formula $$M_2 = E_{(PINOFF+PIN)}(ACCT) \tag{5}$$

The above formula implies that the account number is encrypted under a key (K') which is specified to be PINOFF+PIN. These two messages are received by the Controller which as stated previously has the master key K stored therein. Keeping in mind the following relationship $$\text{PINTRUE} = E_K(\text{ACCT}) = E_K(M_1) \qquad (6)$$

The Controller then computes the quantity which is referred to herein as $$M_2' = E_{PINTRUE}(M_1) \qquad (7)$$

$M_1$ is the account number of the customer sent in clear form from the terminal to the Controller and in accordance with formula (1) the encryption of this account number under the system master key should produce the quantity PINTRUE. Similarly as indicated in formula (1) if the proper quantity PINOFF and PIN are entered by the customer and passed through the bitwise modular addition they should similarly produce the quantity PINTRUE. At this point it will be apparent that the two quantities $M'_2$ computed by the Controller and the message $M_2$ transmitted from the terminal to the Controller should be equal if the proper relationship exists between PINOFF, PIN, and PINTRUE. If there is agreement the Controller accepts the identity of the customer and proceeds to check the negative file. If satisfactory the transaction is continued, still using the key PINOFF $\boxplus$ PIN = $E_K$(ACCT) = PINTRUE. The above procedures have the following advantages.

No key is resident in the terminal. It is known that exposure of such a key, whether a key is used in transmission, or one such as k, used in authentication, can lead to serious or complete compromise of such a system. In the present system the necessity of guarding K is removed with respect to the terminal, although it remains with respect to the Controller, Host and the management of information about these.

The information available to a wiretapper or interceptor consists of the messages $M_1$ and $M_2$ transmitted from the terminal to the controller. Subsequently, the Controller will transmit various transaction messages back to the terminal but these as stated previously will be encrypted under the terminal-computed PINTRUE which equals PINOFF $\boxplus$ PIN. It is assumed that the encryption/decryption algorithm E is sufficiently strong to resist the determination of PINTRUE or K under these assumptions. If so, only the account number becomes available, as this is transmitted in clear form. Even this exposure which might be of incidental use to an opponent could be reduced by the use of an additional resident and perhaps alterable transmission key or cipher key for use of all transmissions between the Terminal and the Controller. The large size (at least 56 bits) of PINTRUE is such as to discourage an opponent from determining it by trail on a computer, knowing only $M_1$ and $M_2$.

The size of PIN can be chosen to be small enough for the user to remember it, and large enough to frustrate exhaustive trials of PIN at a terminal by the possessor of a lost or stolen card, even though this card does contain all PINOFF.

For a computerized attack by enumerating all possible PINs without trials at a terminal, an opponent would need both the $M_1$ and $M_2$ of a transaction, and possession of the card containing $M_1$ and PINOFF. Even success in such an unlikely circumstance should give access only to a single PINTRUE = $E_K(M_1)$ not to K for the whole system. Only the same limited information would be available to the possessor of a card and its (supposedly secret) PIN.

Further, if the relation $\boxplus$ is suitably chosen, PIN can be chosen at will, either by the bank or by the user, as desired, and can be altered at will by altering PINOFF in a complementary fashion to yield the same PINTRUE. The suitability requirment is that PINOFF $\boxplus$ = PINTRUE be the inverse of a function PINOFF = PINTRUE − PIN defined at least over the desired domain of PIN. The previous example of (self-inverse) function of bitwise addition mod 2 ( $\boxplus$ ), is one such.

It should be noted that it is possible for several master keys $K_j$, e.g., for different banks, to be used. In a transaction the proper $K_j$ could be determined by an indicator in the account number (or even by trial).

An opponent trying to "invent" or fabricate the card containing the quantities ACCT, PINOFF and PIN which would appear valid to the system must be able to find or invent ACCT and PINTRUE related by the formula $$\text{PINTRUE} = E_K(\text{ACCT}) = E_K(M_1)$$

This appears infeasible without knowledge of K and impractical by trial because of the size of the fields ACCT and PINTRUE, and the fact that each trial must be made at a terminal.

An additional feature included with the present system which enhances the reliability of the system is the use of terminal-unit status (TSI) information also transmitted from the Terminal to the Controller when an authentication request is made. This status information could be from a bill counter, coin counter, transaction counter, or the like located in the Terminal and mirrored in the Controller, which would assumedly change whenever a successful transaction is completed. This status information, encrypted under the computed key PINOFF + PIN is then used by the Controller, first to check that the received message is current, and then when it retransmits a credit approval or authentication (or the denial of these) back to the terminal. Before the approval is accepted by the Terminal a check is first made against the status information to make certain that the message from the Controller is current. This prevents acceptance of a stale terminal request by the Controller, or of a stale credit approval message by the Terminal, which might otherwise be utilized by a sophisticated wiretapper who might otherwise attempt to send stale recorded messages to the Controller or Terminal.

Figure 3A:
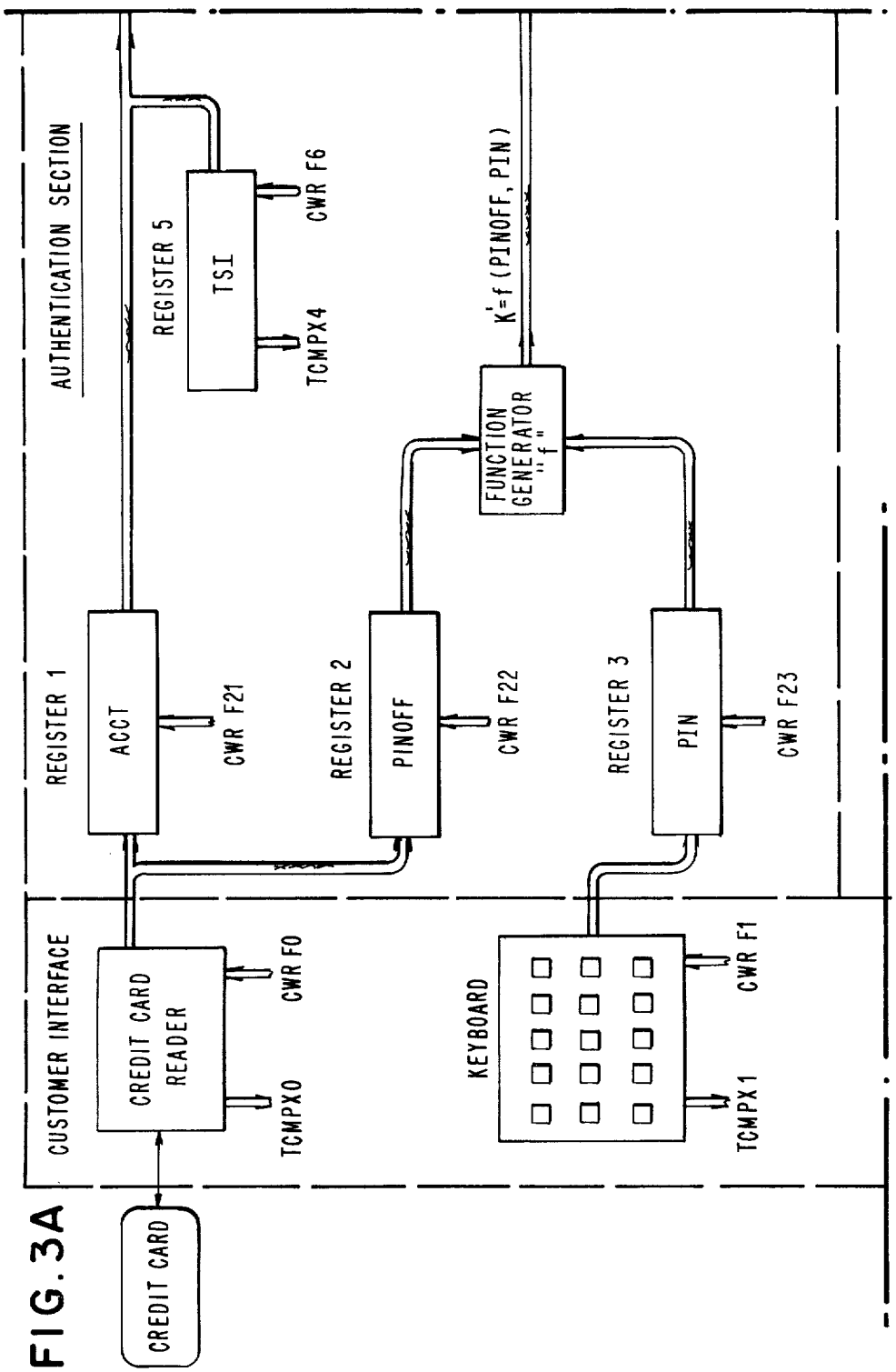
Figure 3B:
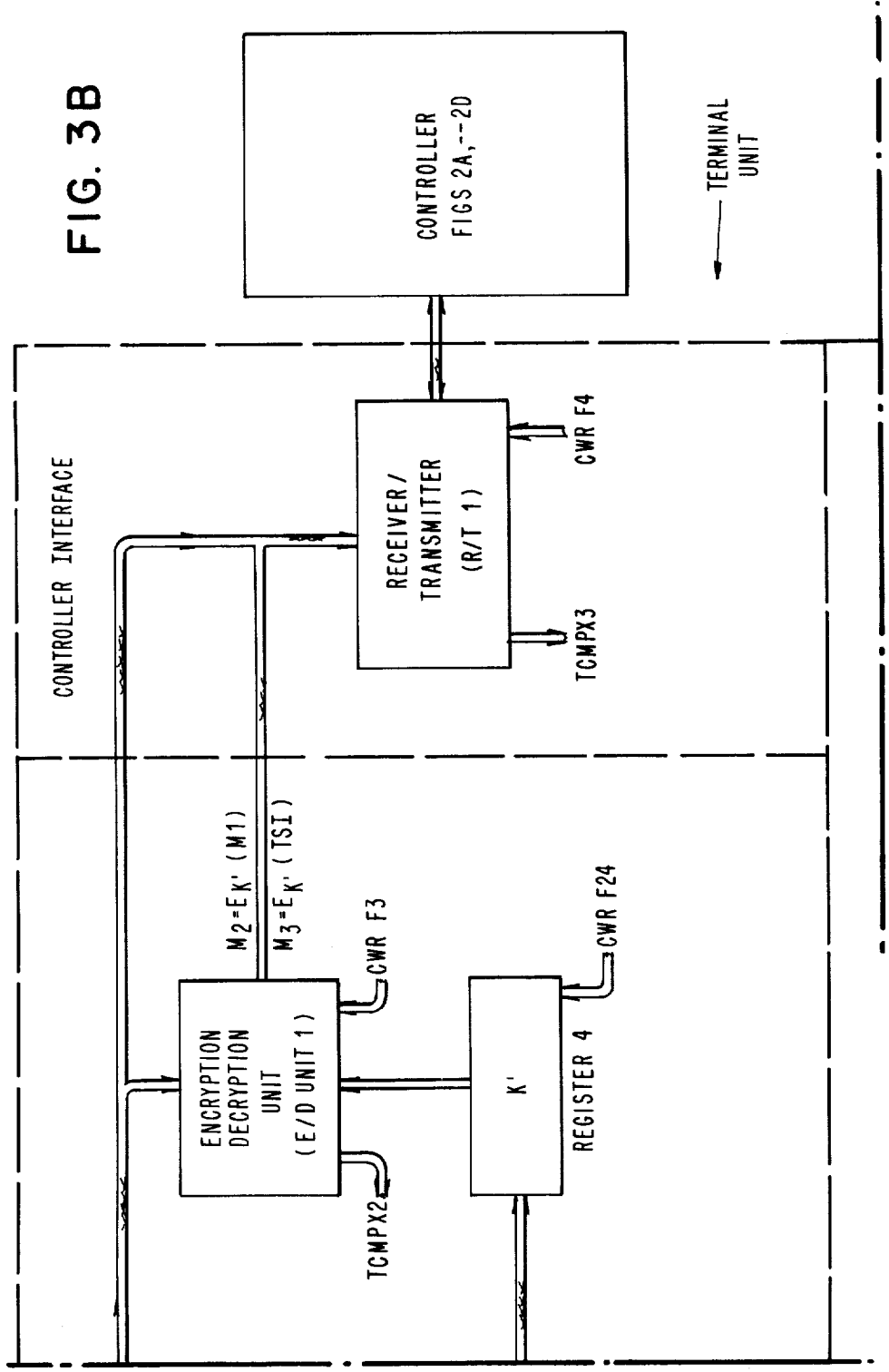
Figure 3C:
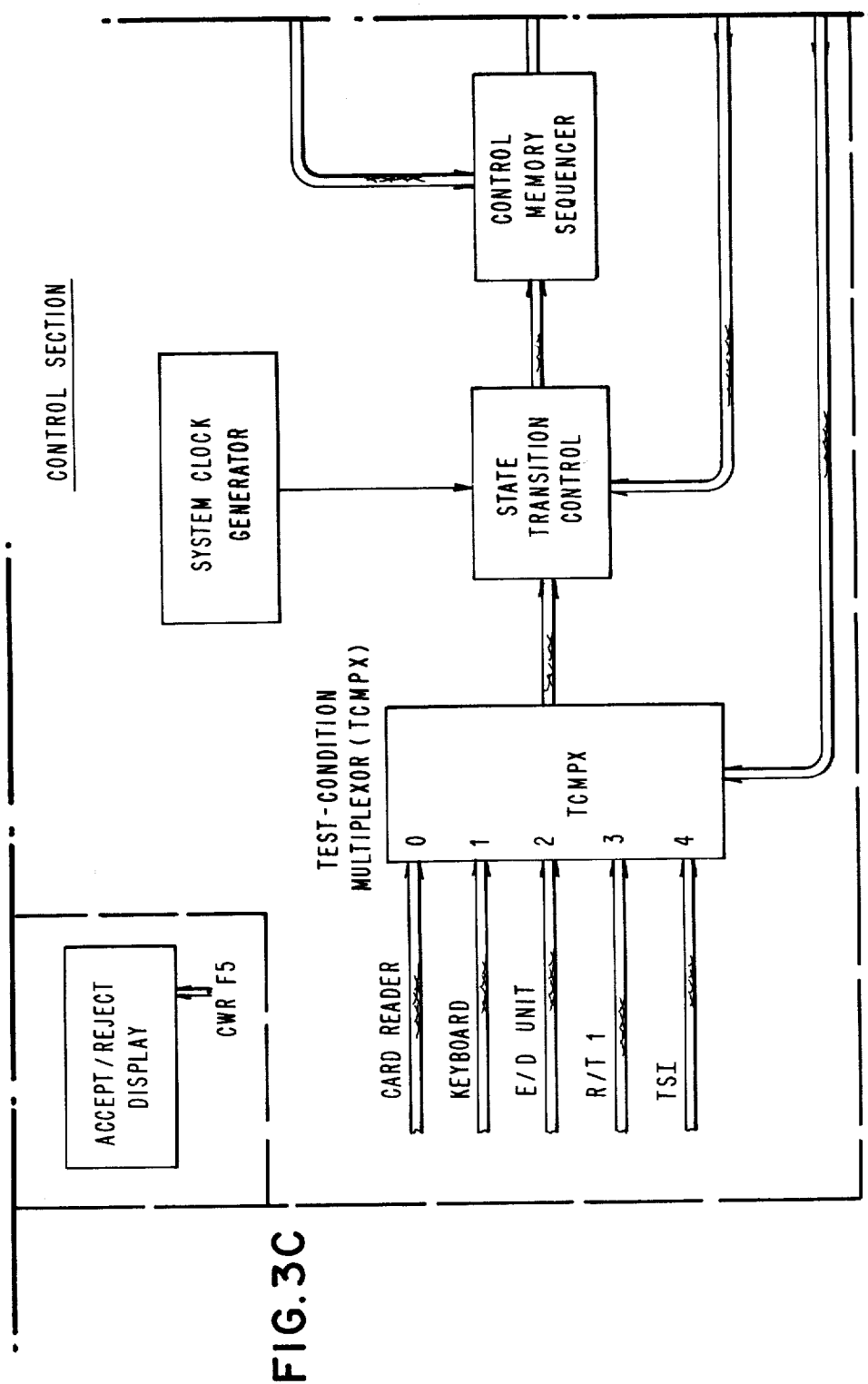
Figure 4B:
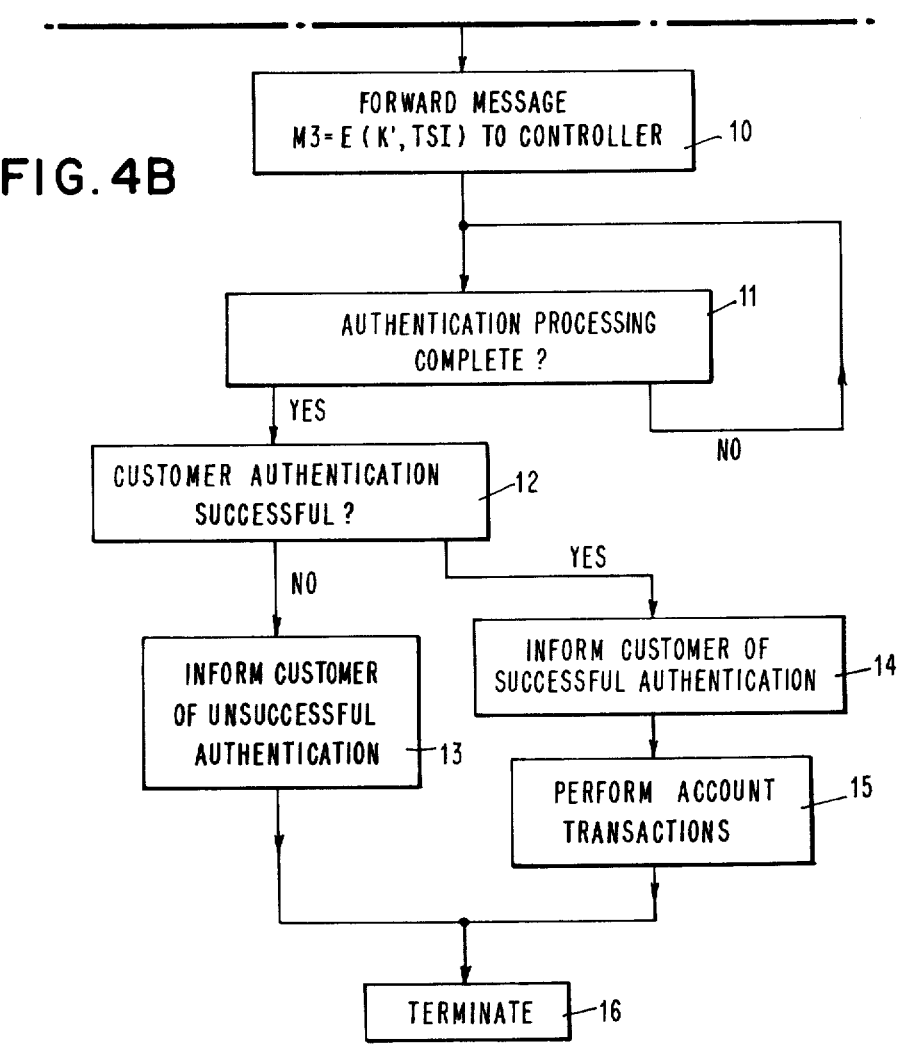
FIGS. 4A and 4B comprise an operational sequence diagram of the operations occurring in a terminal during an authentication procedure.
Figure 4:
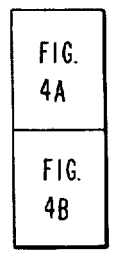
FIG. 4 comprises an organizational diagram for FIGS. 4A and 4B.

Having thus generally described the principles and underlying features of the present invention there will follow a description of the presently disclosed hardware embodiment shown in FIGS. 2 and 3 and described functionally in FIGS. 4 and 5.

Best Mode for Carrying out the Invention

Figure 2D:
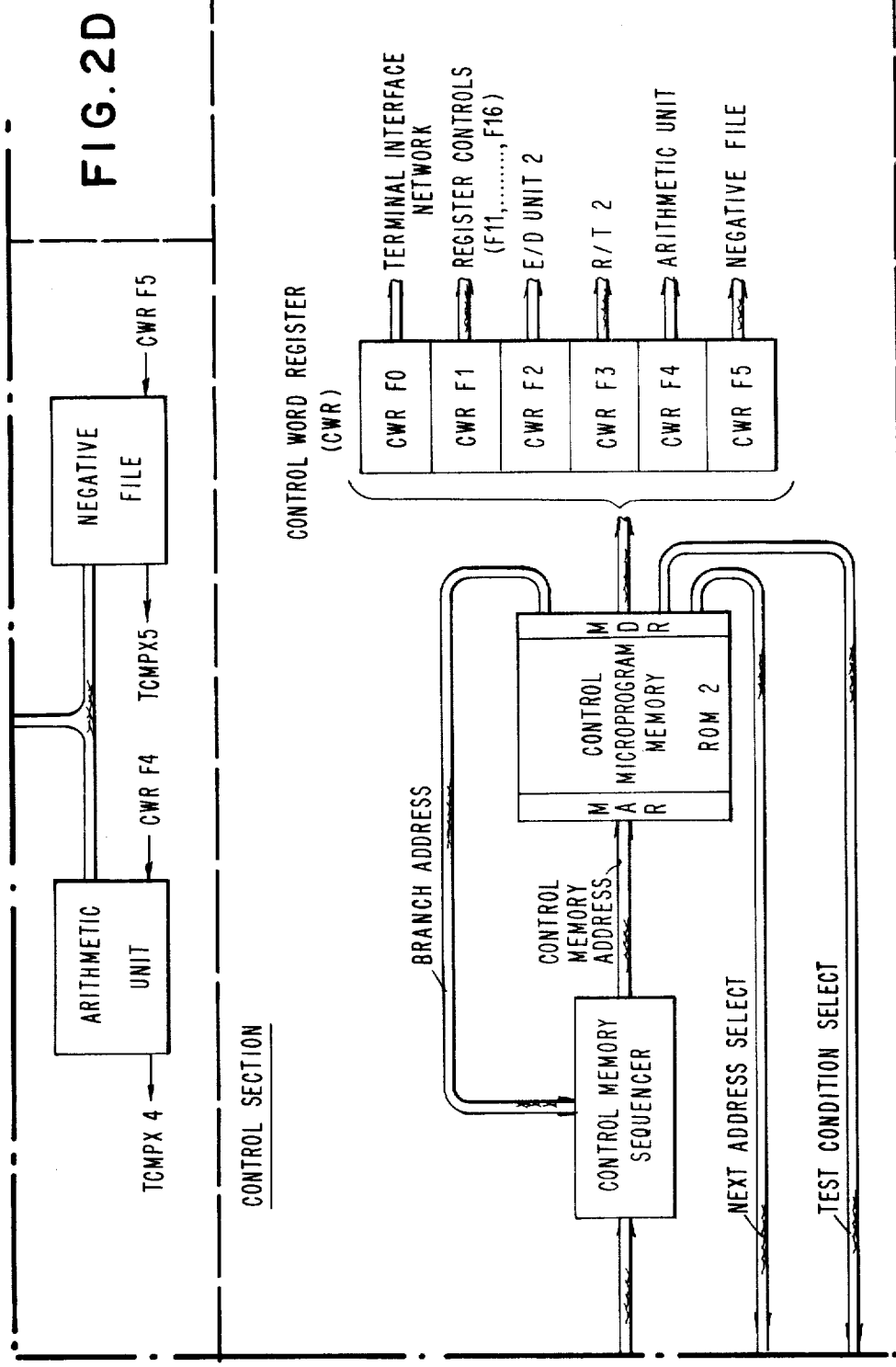

The presently disclosed embodiment is basically a micro control sequence driven system wherein the control sequences are stored in the two read only memories ROM 1 and ROM 2 shown in FIGS. 3D and 2D respectively in the Terminal and Controller Units. Each of the read only memories is shown as having four output cables. The primary resource control cable goes into the respective Control Word Register (CWR) fields. Another of the cables is labeled "Branch Address" which specifies a branch address field within the Read Only Memory which branch is to be taken depending upon the particular conditions tested for by the Test-Condition Multiplexor (TCMPX). It will be understood by those skilled in the art that very few of the individual instructions in the ROM would contain a branch address.

The cable marked Test-Condition Select goes to the TCMPX and selects the particular input line whose condition is being tested, said test being determinative of what will happen next in the system sequence of operations. Thus, to the left of each of the test condition multiplexors, it will be noted that a number of input lines are present. Any of these lines can either be a 0 or a 1 depending on the particular circuit convention being used. The output of the Test Condition Multiplexor in both units is fed into the State Transition Control Unit, said unit having two other inputs, one from the System Clock Generator which continuously supplies synchronizing clock pulses to the system and is selected to have a frequency or period such that an appropriate address may be loaded from the Control Memory Sequencer into the ROM and the data therein read out. The other input to the State Transition Control comes from the ROM and is labeled Next-Address Select. This line in effect instructs the State Transition Control Unit as to how to use the data it receives from the TCMPX. Thus, if the input on line 0 from the card reader is being monitored in the TCMPX a 0 appearing on the line would indicate that the PIN had not yet been entered into the keyboard and the system must remain in a wait or hold state. Alternatively, when a 1 appears on this line the system is in effect apprised that the PIN has been entered into register 3 via the keyboard which will cause a 1 to appear on the input 1 to the TCMPX as will be understood. A 0 or a 1 appearing at the input to the State Transition Control unit when it is in some other state might be interpreted to be either an instruction to increment the memory address register and take the next instruction in the sequence or to select the branch address supplied by the ROM 1 in the event that a particular condition is fulfilled as tested for by the TCMPX and the State Transition Control Unit.

It will thus be apparent by referring to FIGS. 2C and 2D which comprise the control section of the Controller and FIGS. 3C and 3D which comprise the control section of the Terminal that the basic architecture is the same. The primary differences reside in the specific inputs to the Test Condition Multiplexors and the outputs from the individual Control Word Registers. All of these inputs and outputs are appropriately labeled and are believed to be self-explanatory, especially taken in conjunction with the following description.

Referring to FIGS. 2A and 2B the specific functional blocks of the Controller shown therein are thought to be apparent. At the right portion of FIG. 2A the dotted block box labeled Terminal Network indicates the Terminals 1,2,...,N are connected through the Terminal Network Interface into the Controller. The Terminal Network Interface controls the necessary holding registers and gating circuits for performing the interface function with the plurality of Terminals and is typical of many communication interface units well known in the art. It will be assumed for the remainder of the explanation of the operation of this system that the various commands coming from the Control Word Register and entering the bottom and leaving the bottom of the Terminal Network Interface (TNI) control data flow to and from a specific Terminal pointed to by the system controls which selection does not form a part of the present invention. The various registers, 6 through 11, store the values clearly specified in said registers and the blocks marked Compare and Encryption/Decryption unit perform obvious functions. Further, in order to aid in a ready understanding of the function of the various registers and their flow paths the specific messages stored in each of the registers is clearly set forth. Thus, messages $M_1$, $M_2$ and $M_3$ are stored in registers 6, 7 and 8. It will similarly be apparent that the message $M_2$ received from the terminal stored in register 7 is compared with the message $M_2{}^{40}$ computed by the Encryption/Decryption unit in the authentication section and stored in register 9. The Receiver/Transmitter blocks R/T 1 and 2 contain the necessary interfaces, amplifiers, etc., to interface with the host computer on the one side and/or with the terminal networks on the other side. The functional operation of these blocks as they are used in the present system will be apparent from the subsequent description of the Control Flow Charts and the Operational Sequence Listings.

Referring now to the upper portion of FIGS. 3A through 3D showing the Authentication Section, Customer Interface and the Controller Interface of the Terminal, it will be noted that the Customer Interface includes a Credit Card Reader which performs the obvious function of reading the account number and personal identification number offset (PINOFF) from the card under appropriate command from the Control Word Register Field F0. Upon completion of a reading operation a "completed" signal is returned from the Credit Card Reader to the TCMPX.

The Keyboard operates in the same way. Upon command from the system as indicated by the input CWR F1 an indication is made to the customer to enter the personal identification number after which a "PIN entered" signal is returned to the TCMPX at input 1. The Accept/Reject display is energized by CWR F5 so that either the "accept" or "reject" indicator would be illuminated.

In the Authentication Section the contents of registers 1, 2, 3, 4 and 5 are clearly shown. Thus, the registers 1, 2 and 3 receive the account number, the personal identification number offset and the personal identification number entered via the Customer Interface. Register 4 receives the computed value for K' which as described previously is computed from the combination of the value PINOFF and PIN. In the preferred embodiment this is indicated as being a bitwise addition mod 2. Register 4 which stores the computed value K' is utilized as the encryption key for encrypting the messages $M_2$ and $M_3$, as indicated. It is believed that the function of the various operation initiation pulses from the Control Word Register to the various functional units is obvious as well as the "operation completed" signals which must be returned from certain of the units to the TCMPX unit. As stated previously, most of these return signals are to assure that the particular operation called for is completed before the next operational sequence is initiated.

It will also be clearly understood that only those control paths in the present hardware are shown which pertain to the present high security authentication operation. It will of course be obvious in particular that the Encryption/Decryption Units in both the terminals and the Controllers could be used for other purposes than authorization, i.e., they may very well be utilized to encrypt and decrypt all transmissions between a Terminal and a Controller or from the Terminal directly to the Host in order to achieve a higher level of security for the various account transactions being carried out.

The particular encryption and decryption keys utilized for account transactions could very well be different than those utilized for authentication purposes. However, such key handling performs no part of the present invention and will not be mentioned further.

Figure 4A:
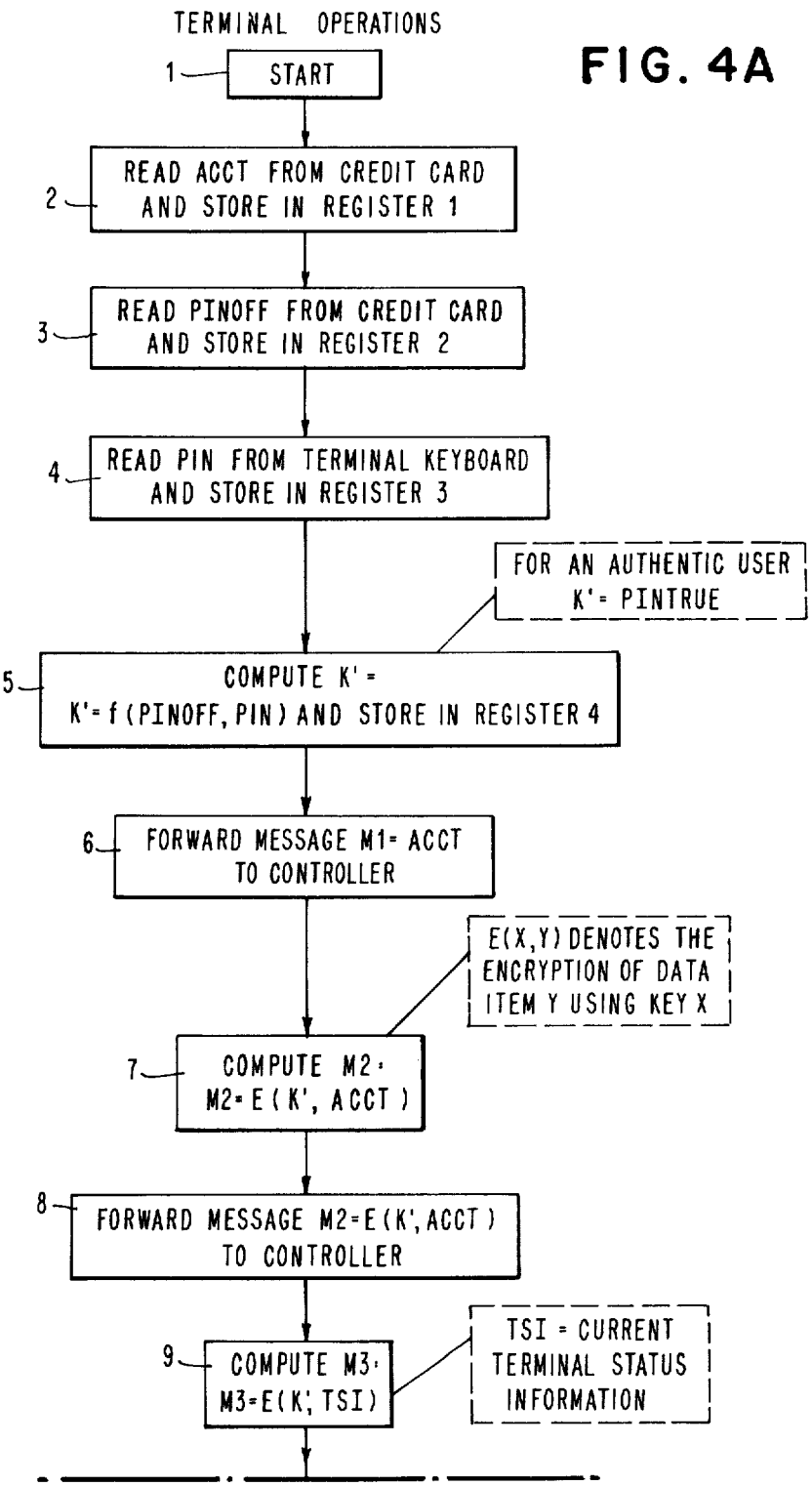

Referring now to FIGS. 4A and 4B (Terminal Operations Flowchart), we will describe the Operational Sequence List for Terminal Operations. A description of the operation of a particular terminal during an authentication procedure, will follow. Before proceeding with the detailed description of this operation, it should first be noted that the numbers used to number the various blocks in the control flow chart of FIGS. 4A, 4B and 5A, 5B correspond to the step numbers in the operational sequence list for the Terminal and Controller units. In both FIGS. 4A, 4B and 5A, 5B the material enclosed in the dotted boxes is merely explanatory of a particular flow chart box to which it is appended. The meaning of all of these boxes is believed to be quite clear and that specific reference to an explanation of same is unnecessary.

The following descriptions of FIGS. 4A, 4B and 5A, 5B with reference to the Operational Sequence Lists for the Controller and Terminal operations respectively will be somewhat brief, however, it is believed that the extremely detailed nature of the Operational Sequence List together with the numeral references to the respective control flow charts is more than adequate to enable a person skilled in the art to follow the specific operations performed in the present system.

Since any customer request must begin with the Terminal, the present brief description of the operation of the system will begin with the description of the operations within the Terminal. Referring to the Operational Sequence List for Terminal Operations, the header of this list defines the terminology used therein. It is reiterated that the step numbers in the two Operational Sequence Lists correspond to the block numbers of the Control Flow Charts of FIGS. 4A and 4B. As is apparent the figures illustrate the control flow in a higher level functional form and may be referred to as desired; however, the following description will make references solely to the Operational Sequence List and the hardware diagrams of FIGS. 3A through 3D.

It may first be assumed that a customer requesting service inserts his card in the Credit Card Reader and presses a start button which will initiate step 1. At this point the terminal hardware resources are properly initialized including turning on the power if necessary and resetting all appropriate Registers to 0. It is assumed that the control section is cleared via the completion of any previous operational sequences therein.

Step 2 causes ROM 1 to be accessed and field F0 of the CWR initiates the Credit Card Reader to cause the account number (ACCT) to be read and field F21 of the CWR causes ACCT to be stored in Register 1. Next, step 3 is begun wherein CWR field F0 initiates the Credit Card Reader operation to read PINOFF and field F22 of the CWR causes PINOFF to be stored in Register 2.

In step 4 field F1 of the CWR unlocks the Keyboard and indicates to the customer that the personal identification number (PIN) is to be entered. Field F23 of the CWR causes the PIN to be stored in Register 3.

In step 5 fields F22 and F23 of the CWR cause the contents of Registers 2 and 3 respectively to be shifted through the Function Generator F, thereby generating the vector $K'=f$ (PINOFF, PIN). As described previously, in a preferred embodiment the Function Generator performs the function of a bitwise addition modulo 2 of appropriate bits of the two values PINOFF and PIN. Next field F24 of the CWR causes the resulting vector $K'$ to be stored in Register 4. The system then proceeds to step 6.

In step 6 fields F21 and F4 of the CWR cause the contents of Register 1 to be transmitted via the Receiver/Transmitter 1 to the Controller to which the Terminal is connected. Thus, message $M_1 = ACCT$ is forwarded to the Controller.

In step 7 fields F21, F24 and F3 of the CWR respectively cause the contents of Register 1 (ACCT) and Register 4 ($K'$) to be loaded into the Encryption/Decryption Unit 1. Field F3 of the CWR then initates the encryption of the data vector ACCT using the key $K'$.

In step 8 fields F3 and F4 of the CWR cause the result of the encryption performed in step 7, $M_2 = E_{K'}$(ACCT), to be forwarded from the Encryption/Decryption Unit 1 to the Controller via the Receiver/Transmitter 1.

In step 9 the next control word causes fields F6, F24 and F3 respectively of the CWR to be actuated to cause the contents of Register 5 (TSI and Register 4 ($K'$) to be loaded into the Encryption/decryption Unit 1. Field F3 of the CWR then initiates the operation of the Encryption/Decryption Unit to encrypt the Terminal Status Information (TSI) using encryption key $K'$. As alluded to previously, the Terminal Status Information is a local continuously changing variable in the Terminal which would vary from transaction to transaction, such as a bill counter or the like. Also as stated previously, the Terminal would have appropriate compare circuits to later compare this status information with the status information sent later from the Controller to the Terminal together with the authorization (or refusal) to carry out the requested operation such as issuing cash, granting credit or permitting entry into a physical facility. Non correspondence of this Terminal Status Information would be used to cause a "non authorization" signal to be produced by the Terminal.

Proceeding to step 10, fields F3 and F4 of the CWR cause the result of the encryption of the Terminal Status Information, $M_3 = E_{K'}$(TSI) to be forwarded from the Encryption/Decryption Unit to the Controller via the Receiver/Transmitter 1.

Step 11 is to essentially set up the system in the Terminal to wait for a response from the Controller as to whether a particular transaction is or is not going to be authorized via the Controller authentication procedures. To do this the Test Condition Select address from the ROM 1 is set to 3, this enables input 3 of the TCMPX to be selected which enables the data link from Receiver/Transmitter 1 to the State Transition Controller. Field F4 of the CWR places the Receiver/Transmitter 1 in the receive mode. The Next-Address Select line from ROM 1 causes the State Transition Control Unit to hold the current Control Memory Address until a response is received from the Controller, at which time the Control Memory Address is incremented in the Control Memory Sequencer and the operations in step 12 commence.

In step 12 the Next-Address Select (from ROM 1) sets the State Transition Control to transfer control to step 13, if the transmission received from the Controller indicates unsuccessful customer authentication. If successful customer authentication is indicated, control flow is transferred to step 14 via the Branch Address supplied over the Branch Address cable from the ROM 1 which is stored in Control Memory Sequencer as explained previously.

In step 13 field F5 of the CWR activates the Accept/Reject Display to inform the customer of an unsuccessful customer authentication. Control is then transferred to step 16 by loading the Branch Address which was included in the instruction sequence of step 13 and stored in the Control Memory Sequencer as will be understood.

In step 14 field F5 of the CWR activates the Accept/Reject Display to inform the customer of successful customer authentication. The termination of step 14 initiates step 15.

In step 15 the address corresponding to the starting location of the "account transaction operational sequence" is loaded into the Control Memory Sequencer via the Branch Address input thereto from the ROM 1. Control is thereby transferred to the operational sequences which handle the various Terminal operations which support account transactions.

Step 16 presupposes that the ROM 1 would load a Branch Address corresponding to the idling or off state of the Terminal in which the Terminal awaits input or an initiating signal from a new customer wishing to use the Terminal. As will be well understood, this Branch Address would be included in the last instruction field of any and all account transaction sequences contained in ROM 1. This completes the description of the operation of the Terminal operational sequence.

Operational Sequence List
for Terminal Operations

DEFINITIONS

CWR Fn: Control-word register, field n
ACCT: Account Number
PIN: Personal Identification Number
PINOFF: Personal Identification Number Offset
K: Master Key
PINTRUE: True Personal Identification Number
Mn: n-th Message
TSI: Current Terminal Status Information
E/D UNIT 1: Encryption/Decryption Unit 1

STEP OPERATION

1. START: TERMINAL hardware resources are appropriately initialized.
2. CWR FO initiates CREDIT CAR 1 READER operation to read ACCT. CWR F21 causes ACCT to be stored in REGISTER 1.
3. CWR FO initiates CREDIT CARD READER operation to read PINOFF. CWR F22 causes PINOFF to be stored in REGISTER 2.
4. CWR F1 unlocks KEYBOARD to permit reading of PIN.
   CRW F23 causes PIN to be stored in REGISTER 3.
5. CWR F22 and CWR F23 cause the contents of REGISTERS 2 and 3, respectively, to be shifted through the FUNCTION GENERATOR, f, to generate $K' = f(PINOFF,PIN)$. CWR F24 causes the result, K', to be stored in REGISTER 4.
6. CWR F21 and CWR F4 cause the contents of REGISTER 1 to be transmitted via RECEIVER/TRANSMITTER 1 to the CONTROLLER. Thus, message $M_1 = ACCT$ is forwarded to the CONTROLLER.
7. CWR F21, CWR F24 and CWR F3, respectively, cause the contents of REGISTER 1 (ACCT) and REGISTER 4 (K') to be loaded into ENCRYPTION/DECRYPTION UNIT 1. CWR F3 then initiates the encryption of ACCT using key K'.
8. CWR F3 and CWR F4 cause the result of the above encryption, $M_2 = E(K',ACCT)$, to be forwarded from ENCRYPTION/DECRYPTION UNIT 1 to the CONTROLLER via RECEIVER/TRANSMITTER 1.
9. CWR F6, CWR F24 and CWR F3, respectively, cause the contents of REGISTER 5 (TSI) and REGISTER -continued Operational Sequence List
for Terminal Operations 4 (K') to be loaded into ENCRYPTION/DECRYPTION UNIT 1. CWR F3 then initiates the encryption of TSI using key K'.
10. CWR F3 and CWR F4 cause the result of the above encryption, $M_3 = E(K',TSI)$, to be forwarded from ENCRYPTION/DECRYPTION UNIT 1 to the CONTROLLER via RECEIVER/TRANSMITTER 1.
11. TEST-CONDITION SELECT address (from the CONTROL MICROPROGRAM MEMORY) is set to 3, thereby enabling the data link from RECEIVER/TRANSMITTER 1 to the STATE TRANSITION CONTROLLER.
    CWF F4 places RECEIVER/TRANSMITTER 1 in the receive mode. NEXT-ADDRESS SELECT (from the CONTROL MICROPROGRAM MEMORY) sets up the STATE TRANSITION CONTROL to hold the current CONTROL MEMORY ADDRESS until a response is received from the CONTROLLER, at which time the CONTROL MEMORY ADDRESS is incremented, and operations in step 12 commence.
12. NEXT-ADDRESS SELECT (from the CONTROL MICRO PROGRAM MEMORY) sets the STATE TRANSITION CONTROL to transfer control to STEP 13 if the transmission received from the CONTROLLER indicates unsuccessful customer authentication: flow of control is transferred to STEP 14 if successful customer authentication is indicated.
13. CWR F5 activates the ACCEPT/REJECT DISPLAY to inform CUSTOMER of unsuccessful customer authentication. Control is transferred to STEP 16 by loading the corresponding BRANCH ADDRESS into the CONTROL MEMORY SEQUENCER.
14. CWR F5 activates ACCEPT/REJECT DISPLAY to inform CUSTOMER of successful customer authentication.
15. The address corrsponding to the starting location of the account transaction operation sequence is loaded into the CONTROL MEMORY SEQUENCER via the BRANCH ADDRESS input from the CONTROL MICROPROGRAM MEMORY. Control is thereby transferred to the subroutine for handling TERMINAL operations that support account transactions.
16. The CONTROL MICROPROGRAM MEMORY loads a BRANCH ADDRESS corresponding to the idling state in which the TERMINAL awaits input from a new customer.

Referring now to the Operational Sequence List for Controller Operations, similarly, the header for this list specifies the definitions utilized within the body of the operations. As with the Operational Sequence List for Terminal Operations, the step numbers included herein correspond to the functional blocks of FIGS. 5A and 5B, however, the following description will make reference solely to the Operational Sequence List for Controller Operations and to the hardware diagrams of FIGS. 2A through 2D. It is again noted that the Operational Sequence List for Controller Operations as with the one for Terminal Operations, specifies the essential operational sequences required of each step. The precise way in which these instructions would be implemented in either ROM 1 or ROM 2 would be up to the system designer, depending upon the precise hardware utilized. Thus, each of the steps would normally include a plurality of individual microprogram sequences which are serial in nature, i.e., the termination of one step is followed by the accessing and performance of the next sequential step. The only branch points in this sequence occurs at steps 6 and 8 which can be most clearly seen in the Control flow chart of FIGS. 5A and 5B. Thus, the majority of the inputs to the TCMPX are status or "job completion" signals which signal the system that the next operation may be commenced.

Referring now to the Operational Sequence List at step 1, the Controller hardware resources are appropriately initialized to commence support of a new Terminal activity and would cause a resetting of the various Registers, 6, 7, 8, 9 and 10. It is noted that Register 11 which contains the master key K would not be reset as this is a fixed system parameter. It should also be noted that depending upon the architectural details of the system, the individual Registers would not necessarily have to be reset to zeros as the entering of new information into same from the Terminal Network Interface or from the Encryption/Decryption Unit 2 could effectively perform a resetting and new information entering in one step.

A Controller sequence would normally be started by a determination from the Terminal Network Interface (TNI) that one of the Terminals has requested an account transaction which will necessitate an "authorization" activity by the Controller. This would bring up line TCMPX 0 eminating from the TNI and entering the TCMPX at field 0. On step 2.1, field F0 of the CWR, which is of course loaded from the particular data word in the MDR of ROM 2, controls the receipt of message $M_1$=ACCT from whichever terminal is requesting activity and has "locked up" the TNI. The field F11 of the CWR causes message $M_1$ to be loaded into Register 6.

Step 2.2 controls, via CWR field F0, the receipt of $M_2 = E_{K'}(ACCT)$ from said Terminal. Field F13 of the CWR causes $M_2$ to be loaded into Register 7. The system then proceeds to step 2.3.

In step 2.3 field F0 of the CWR controls the receipt of $M_3 = E_{K'}(TSI)$ from the given Terminal. Field F12 of the CWR causes message $M_3$ to be loaded into Register 8. At this point all of the necessary information from the Terminal has been received and loaded into the authentication section of the Controller Unit and the system is ready to proceed with the various computations to determine the authenticity of the customer currently at the Terminal.

In step 3, fields F11, F16 and F2 respectively appearing in the CWR cause the contents of Register 6 ($M_1$) and Register 11 (K) to be loaded into the Encryption/Decryption Unit 2. Field F2 appearing in the CWR then initiates the operation of the E/D Unit 2 to encrypt $M_1$ using the master key K. Field F14 of the CWR, then causes the result $K'' = E_K(M_1)$ to be stored in Register 9. The system then proceeds to step 4.

In step 4 fields F11, F14 and F2 respectively appearing in the CWR cause the contents of Register 6 ($M_1$) and Register 9 $K''=$(PINTRUE) to be loaded into the Encryption/Decryption Unit 2. Field F2 of the CWR then initiates another operation of the Encryption/Decryption Unit to encrypt $M_1$ using the computed key PINTRUE. The current key, $K''=$PINTRUE, is retained in an internal storage within the Encryption/Decryption Unit 2, for use in subsequent Controller operations pertinent to a given Terminal. Field F14 in the CWR causes the result, $M_2' = E_{K''}(M_1)$ to be stored in Register 9. Thus, it may be seen in this step that the account number (ACCT) received from the Terminal, as message $M_1$, is encrypted utilizing the computed key PINTRUE to produce the message $M_2'$. The system then proceeds to step 5.

In step 5, fields F12 and F2 appearing in the CWR cause the contents of Register 8 ($M_3$) to be loaded into the Encryption/Decryption Unit 2. Field F2 of the CWR then initiates a decryption cycle of $M_3$ using the key PINTRUE. Field F15 of the CWR causes the result referred to herein as $TSI' = D_{PINTRUE}(M_3)$, to be stored in Register 10. The system then proceeds to step 6.

In step 6 a branch condition test is set up wherein the Test Condition Select line from the ROM 2 is set to a 1 thereby selecting input 1 to the TCMPX which comes from the compare block in the authentication section. The Next-Address Select line from the MDR of the ROM 2 sets up the logic circuitry in the State Transition Control Block such that control will transfer to step 7 if the comparison of the contents of Register 7 ($M_2$) and Register 9 ($M_2'$) is successful, and to step 10 if the comparison is unsuccessful. A similar check can be performed that $TSI' = TSI''$, where the latter is the Controller's memory if the state of the TSI of the particular terminal being serviced. The details of such verification are omitted. If it fails, control will likewise be transferred to step 10.

Assuming that the control branches to step 7 in this sequence, field F0 appearing in the CWR activates the Terminal Network Interface to inform the Terminal of a successful customer authentication. This notification can include $TSI'$ and should be enciphered using key $K''$. The details for this are not shown. The system then proceeds to step 8.

In step 8 the second branch test is made mainly to determine whether the overall system mode is to be on-line, that is, the Host is to perform the account transaction processing or whether the operating mode will be Off-Host wherein the transaction is to be performed within the Controller. To effect this test the Test Condition Select field in the Memory Data Register (MDR) of the ROM 2 is set to a 3 whereby input 3 of the TCMPX is selected to pass through to the State Transition Control unit. As will be noted, input 3 of the TCMPX is connected to the appropriately labeled line from the Receiver/Transmitter 2. The next instruction causes field F3 of the CWR to activate the Receiver/Transmitter 2, to interrogate the Host Computer for system mode status. The Next-Address Select line connected to the MDR of the ROM 2 sets up the State Transition Control Unit logic to transfer control to step 9 if the Host Computer is down or off-line for some other reason, or alternatively to step 11 if it is on-line.

Assuming that the Host is off-line, step 9 is entered. In this step the address corresponding to the starting location of the Off-Host account transaction operational sequence is loaded into the Control Memory Sequencer Unit via the Branch Address line and the appropriate field of the MDR of the ROM 2. Control is thereby transferred to the Off-Host operational sequence for handling Controller operations that support Off-Host account transactions. It will be noted that the blocks marked Negative File and Arithmetic Unit in the "Off-Host Transaction Processing Sections" of the Controller are only exemplary of various Off-Host operations. The function of a negative file is obvious and would lead to a rejection based on membership in said file. The arithmetic unit might be utilized to monitor account balance, etc., in individual customer accounts. The CWR inputs and the TCMPX outputs from these two units are merely shown as illustrative of initiating and terminating pulses used to control the overall system operation. However, since such account transactions form no part of this invention no further expression of same is deemed necessary. The authorization to the Terminal to perform terminal-related activities such as the issuance of cash, is enciphered under key K" and sent to the Terminal by appropriate instructions (not shown) to E/D Unit 2, CWR, etc. Upon the completion of an account transaction for a given customer, control is transferred back to step 12. This step is basically a termination step wherein for the simplest case the ROM 2 would cause the Branch Address corresponding to the Controller's "standby" state would be loaded into the MDR of ROM 2. This would in essence cause the Terminal Network Interface to return to a monitoring state wherein it monitors the various Terminal connections for any further request for service.

Assuming, at this point, that the branch condition of step 6 had caused the system to branch to step 10, field F0 appearing in the CWR activates the Terminal Network Interface to inform the Terminal and thus the Accept/Reject Display located in the Customer Interface to notify the customer of an unsuccessful authentication. The completion of this step returns the system to step 12 which terminates the authentication operations which end the Controller operations.

If the branch condition test at step 8 had caused step 11 to be entered due to on-line availability of the Host, then fields F0 and F3 of the CWR would cause a data path to be set up in the TN1 and R/T 2 to link the terminal to the Host to facilitate on-line account transaction processing. The termination of same will return control to step 12 described above.

| Operational Sequence List for Controller Operations |
|---|
| DEFINITIONS |
| CWR Fn: Control-word register, field n |
| ACCT: Account Number |
| PIN: Personal Identification Number |
| PINOFF: Personal Identification Number Offset |
| K: Master Key |
| PINTRUE: True Personal Identification Number |
| Mn: n-th Message |
| TSI: Current Terminal Status Information |
| E/D UNIT 2: Encryption/Decryption Unit 2 |

| STEP | OPERATION |
|---|---|
| 1. | START: CONTROLLER hardware resources are appropriately initialized to commence support new terminal activity. |
| 2.1 | CWR F0 controls the receipt of $M_1$ = ACCT from given terminal. CWR F11 loads $M_1$ into REGISTER 6. |
| 2.2 | CWR F0 controls the receipt of $M_2$ = E(K', ACCT) from given terminal. CWR F13 loads $M_2$ into REGISTER 7. |
| 2.3 | CWR F0 controls the receipt of $M_3$ = E(K', TSI) from given terminal. CWR F12 loads $M_3$ into REGISTER 8. |
| 3. | CWR F11, CWR F16 and CWR F2, respectively, cause the contents of REGISTER 6 ($M_1$) and REGISTER 11 (K) to be loaded into ENCRYPTION/DECRYPTION UNIT 2. CWR F2 then initiates the encryption of $M_1$ using key K. CWR F14 causes the result, K" = PINTRUE = $E_K(M_1)$, to be stored in REGISTER 9. |
| 4. | CWR F11, CWR F14 and CWR F2, respectively, cause the contents of REGISTER 6 ($M_1$) and REGISTER 9 (PINTRUE) to be loaded into ENCRYPTION/DECRYPTION UNIT 2. CWR F2 then initiates the encryption of $M_1$ using key PINTRUE. The current key, PINTRUE, is retained in internal storage within ENCRYPTION/DECRYPTION UNIT 2 for use in subsequent CONTROLLER operations pertinent to given TERMINAL. CWR F14 causes the result, $M_2'$ = E(PINTRUE,$M_1$), to be stored in REGISTER 9. |

| | Operational Sequence List for Controller Operations -continued |
|---|---|
| 5. | CWR F12 and $C_3R$ F2 causes the contents of REGISTER 8 ($M_3$) to be loaded into ENCRYPTION/DECRYPTION UNIT 2. CWR F2 then initiates the decryption of $M_3$ using key PINTRUE. CWR F15 causes the result, TSI' = D(PINTRUE,$M_3$), to be stored in REGISTER 10. |
| 6. | TEST-CONDITION SELECT address (from the CONTROL MICROPROGRAM MEMORY) is set to 1, thereby enabling the path from the COMPARE block to the TEST CONDITION MULTIPLEXER. The NEXT-ADDRESS SELECT (from the CONTROL MICROPROGRAM MEMORY) sets up the STATE TRANSITION CONTROL such that control will transfer to STEP 7 if the comparison of the contents of REGISTER 7 ($M_2$) and REGISTER 9 ($M_2'$) is true, and to STEP 10 if false. |
| 7. | CWR F0 activates TERMINAL NETWORK INTERFACE to inform TERMINAL of successful customer authentication. |
| 8. | TEST-CONDITION SELECT address (from the CONTROL MICROPROGRAM MEMORY) is set to 3, thereby enabling the data link from RECEIVER/TRANSMITTER 2 to the TEST-CONDITION MULTIPLEXER. CWR F3 causes RECEIVER/TRANSMITTER 2 to interrogate the HOST COMPUTER for system mode status. NEXT-ADDRESS SELECT sets up the STATE TRANSITION CONTROL to transfer control to STEP 9 if the HOST COMPUTER is down or off-line, and to STEP 11 if it is on-line. |
| 9. | The address corresponding to the starting location of the OFF-HOST account transaction operational sequence is loaded into the CONTROL MEMORY SEQUENCER via the BRANCH ADDRESS input from the CONTROL MICROPROGRAM MEMORY. Control is thereby transferred to the subroutine for handling CONTROLLER operations that support OFF-HOST account transactions. Upon completion of account transactions for the current customer, control is transferred to STEP 12. |
| 10. | CWR F0 activates TERMINAL NETWORK INTERFACE to inform TERMINAL of unsuccessful customer authentication |
| 11. | CWR F0 and CWR F3 set up data path via TERMINAL NETWORK INTERFACE and RECEIVER/TRANSMITTER 2 linking given TERMINAL and HOST COMPUTER to enable on-line account transaction processing. |
| 12. | The CONTROLLER MICROPROGRAM MEMORY loads the BRANCH ADDRESS corresponding to the CONTROLLER's terminating activity for the given TERMINAL. As will be obvious at this point, the Controller will continuously moniter the TERMINAL NETWORK for any new requested activity. |

The above description of the Controller Operations thus completes the description of the preferred embodiment of the present invention, especially as used in a Cash-Issuing Terminal or the like.

It will also be noted that a specific system use has not been shown for the decrypted value of TSI described herein as vector TSI'. Although the decryption operation is performed by the Authentication Section, the specific use of the status information would be up to the system designers. A general use has been described previously, and need not be discussed further.

Although, the computation of PINTRUE has been shown as a functional combination of PINOFF and PIN for reasons of convenience in order to obtain a satisfactorily large and thus secure encryption operation, it will be understood that PINTRUE could be a completely memorized Personal Identification Number. Other obvious extensions of the invention would also be possible by those skilled in the art.

Industrial Applications

The present invention is particularly suited for use with Cash-Issuing Terminals in the banking industry and credit authorization, point of sale, or the like terminals in the retail sales industry where it is required that a high security system for customer authentication be used. In view of the substantially uncontrolled locations in which such terminals are frequently placed and also due to the fact that the personnel operating such Terminals may not have high system security clearance, it is highly desirable that the master encryption key for the system never be stored in the terminal or appear in communication channels connecting the terminal to a Host Computer.

The invention might also be utilized to control facility access in substantially the same manner as for Cash-Issuing terminals wherein a successful authentication would allow an entry gate or the like to be opened.

Similarly, a modification of the system could relatively easily be adapted for the use of a computer having many remote terminals wherein the authentication procedure would be entered before a user is allowed to sign-on the system. Thus, the account number once properly authenticated could control access to the terminal, to various files within the Host Computer as well as set up procedures for appropriate billing for CPU time.

In general, the system could have wide applicability in the burgeoning Electronic Funds Transfer Industry and many other specific uses not herein mentioned would no doubt be possible.

While the invention has been particularly shown and described with reference to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A personal identification system for effecting the authentication of users at a series of remote terminal devices, each of which is connected to a central computational facility, wherein each terminal includes means for entering personal identification criteria and further includes a resident encryption/decryption device located therein, the improvement in said personal identification system which comprises:

secure means external to each said terminal for verifying said user entered personal identification criteria, said system comprising at least one central computational facility to which each of said terminals is connected, each said terminal including means therein for reading a user inserted token having printed thereon, in machine readable form, a first data word (ACCT) unique to said user, means operable by said user for physically entering a unique personal identification number (PIN) where said PIN bears a unique functional relationship to the cryptographic transformation of said first data word, means for transmitting said first data word (ACCT) in recoverable form to said centralized computing facility, means for cryptographically transforming said first data word as a function of at least said PIN under a suitable encryption key and for transmitting same to said centralized computational facility, wherein said encryption key is a function of said PIN, means resident in said centralized computational facility for cryptographically verifying the relationship between said PIN and said first data word entered at said terminal and, means for producing an accept/reject signal in response thereto.

2. A personal identification system as set forth in claim 1 wherein said system includes a host-computer which is connected to at least one centralized computational facility operating as a Controller for interfacing said terminals to said host-computer, and means in each Controller, for causing account transactions to be performed by the host when said host is available or by said Controller when the host is not available.

3. A personal identification system as set forth in claim 2 including means in each said terminal for reading an off set value recorded on said token in machine readable form, and means for combining said off-set value with said PIN to produce a resultant encryption key, means for supplying said encryption key to said encryption/decryption device resident in each said terminal for encrypting said first data word and for transmitting said first data word encrypted under said key to said Controller.

4. A personal identification system for use in a Multi-Remote Terminal Computer System for identifying users at a terminal, each said terminal including means for entering personal identification criteria therein and further including a resident encryption/decryption device, the improvement in said personal identification system which comprises secure means, external to said terminal, for verifying said user entered personal identification criteria, said system comprising:

at least one central Host Computer and a plurality of intermediate Controller devices functionally located between said computer and a number of said terminal devices, each Controller including a resident encryption/decryption device and wherein each terminal is connected to said Host Computer through a Controller, each said Terminal having means for reading a user inserted token having printed thereon, in machine readable form, a first data word (ACCT) unique to said user, means for physically entering a unique memorized personal identification number by said user as a second data word and means for reading a third data word on said token which bears a unique functional relationship to said first data word in combination with said user entered personal identification number, means for transmitting said first data word in recoverable form as a first message ($M_1$) and said second and third data words as a non-recoverable function of said encryption/decryption device and said first data word as a second message ($M_2$) from said Terminal to its associated Controller, means resident in said Controller for cryptographically verifying the relationship between said second and third data words relative to said first data word entered at said Terminal and means for notifying said terminal that the proper relationship does or does not exist.

5. A personal identification system as set forth in claim 4 including means for sending a fourth data word from the Terminal to said Controller as third message ($M_3$) specifying the current status of operations within said Terminal which can only exist at the current time, and means in said Terminal for receiving status information with messages from said Controller to verify that the status conditions have been properly met.

6. A personal identification system as set forth in claim 4 wherein said means for cryptographically verifying the relationship between said first data word (ACCT) and said second and third data words includes means for entering a master key (K) stored at said Controller into the encryption/decryption device resident in said Controller and means utilizing said master key in combination with said two message words ($M_1$ and $M_2$) for verifying the functional relationship between said first data word (ACCT) and said PIN.

7. A personal identification system as set forth in claim 6 including means for transmitting said first data word from said Terminal to said Controller in clear form,
- means for performing a bitwise transformation on the said second and third data words to form an encryption key (K'),
- means utilizing said encryption device in said Terminal for performing a key-controlled block cipher cryptographic transformation on said first data word under control of said computed encryption key (K') to form said message $M_2$ and for transmitting said encrypted message ($M_2$) to said Controller, and
- means for utilizing said encryption key (K') for encrypting and then transmitting said status information in encrypted form to said Controller as massage $M_3$.

8. A personal identification system as set forth in claim 7 wherein said encryption/decryption device in said Controller is functionally identical to that located in each Terminal and inluding key storage means located in said Controller for storing the system master key (K),
- means for encrypting the message $M_1$ received from said Terminal as a function of said master key resident in said Controller device to produce a key (K''),
- means for again encrypting the message $M_1$ under control of the computed key (K'') to produce a message $M_2'$,
- means for comparing the message $M_2'$ produced by the encryption device with the message $M_2$ received from said Terminal, and
- means actuable upon a successful comparison for notifying the Terminal that a positive identification of the user at the Terminal has ben received.

9. A personal identification system as set forth in claim 8 wherein each said terminal includes means for reading and storing said second data word read from said user inserted token and means utilizing said second data word in combination with said user entered PIN to produce said encryption key K' via a bitwise modulo 2 addition of predetermined bits of said two words and wherein the length of said second data word is substantially greater than that of the user entered PIN.

10. A personal identification system as set forth in claim 9 including means in said Controller for utilizing said computed key (K'') for decrypting the status word message ($M_3$) to produce a status word which may be utilized for veryifying transaction status within the Controller and for subsequent retransmission to and verification by the terminal.

11. A message handling protocol for enhancing the security of the personal identification procedures of an electronic data processing system said system comprising a plurality of terminals and at least one centralized data processing facility wherein the personal identification procedures are to be performed, wherein each of said Terminals and said centralized data processing facility include an encryption/decryption device capable of performing a key-controlled block cipher cryptographic transformation on blocks of data supplied to same, each said Terminal further including means for reading a first unique personal identification data word (ACCT) from a token carried by a user of the system and for accepting a second unique memorized and personally entered data word (PIN) by said user, wherein a predetermined cryptographically ascertainable relationship exists between said first and second words, said method comprising the steps of:
- transmitting said first data word from said termanal to said centralized computing facility in recoverable form as a first message word ($M_1$),
- converting said personally entered data word (PIN) into a non-recoverable form by means of said encryption/decryption device, including deriving an encryption key as a function of said PIN and encrypting said first data word under said derived key, and
- transmitting said converted word to said central computing facility as a second message word ($M_2$),
- performing a cryptographic transformation of said first message word in said centralized computing facility under control of a master key, and
- comparing the results of said transformation with the second message word ($M_2$) transmitted from said Terminal to said centralized processing facility, and
- indicating a positive identification if the predetermined relationship exists therebetween.

12. A message handling protocol as set forth in claim 11 including the step of encrypting a data word representative of current status information in said Terminal as a cryptograhic function of said user entered data word utilizing said encryption/decryption device in said Terminal,
- transmitting said encrypted status word as message word $M_3$ to said centralized computing facility, and
- decrypting said status word in said centralized computing facility utilizing the encryption/decryption device resident therein under control of a key derived from said first data word.

13. A message handling protocol as set forth in claim 11 including in said Controller the steps of recovering said first data word from the message word $M_1$ received from said Terminal,
- encrypting said recovered data word under control of said stored master key (K) resident in said central computing facility to form a second key (K''), using the second key to again encrypt said recovered first data word to form a data word $M_2'$, and comparing said data word $M_2'$ with the second message word $M_2$ transmitted from said Terminal to said central processing facility.

14. A message handling protocol as set forth in claim 13 including the steps of further utilizing said second derived key ($K''$) to decrypt the third data word $M_3$ transmitted from said Terminal to said centralized $M_3$ transmitted from said Terminal to said centralized computing facility to derive the status information contained therein.

15. A message handling protocol for use in a remote terminal oriented computer system having a plurality of terminals connected to a central host computer via at least one intermediate Controller unit to which each terminal is connected, each terminal and each Controller having resident therein a functionally identical key-controlled block cipher encryption/decryption device, said protocol being characterized by a unique functional relationship between an account number stored on a user inserted token which may be inserted in a terminal for reading and a memorized personal identification number which is memorized by the user and personally entered at the terminal, and wherein said account number stored on said token and the personal identification number are related to each other by a perdetermined key-controlled cryptographic transformation as a function of a master system key, said system being further characterized by the fact that said master key is stored only in the Controller devices and neither said system master key nor the personally entered identification numbers ever appear on the communication lines between a terminal and its associated Controller, said protocol including the steps of;

reading the account number from the user inserted token and transmitting same to said Controller as a first message word $M_1$, encrypting said account number under control of an encryption key which is a function of the user entered personal identification number and transmitting said encrypted word to said Controller as a second message word $M_2$, the Controller operations comprising the steps of encrypting the received message word $M_1$ under control of the system master key ($K$) to form a further key $K''$, reencrypting the message $M_1$ under control of said computed key $K''$ to produce a cryptogram $M_2'$, comparing the message word $M_2$ received from the terminal with the cryptogram $M_2'$ and notifying the terminal of a successful comparison, determining if the host-computer is available to process a particular transaction requested by a user at a terminal, and, if the host is available, connecting the terminal directly to the host computer via said Controller to allow a transaction to proceed.

16. A message handling protocol as set forth in claim 15 wherein said token carries a second data word in machine readable form, utilizing said second data word as an offset value and fuctoinally combining same with the user entered personal identification number to form a resultant personal identification number (PINTRUE) and using this resultant personal identification number as the encryption key at the terminal for encrypting said account number for transmission to said Controller.

* * * * *